US012413809B2

(12) United States Patent
Matusek et al.

(10) Patent No.: US 12,413,809 B2
(45) Date of Patent: Sep. 9, 2025

(54) METHODS AND SYSTEMS FOR PRIVACY PROTECTING A LIVE VIDEO STREAM WITH AN ARCHIVED VIDEO STREAM

(71) Applicant: GENETEC INC., Saint-Laurent (CA)

(72) Inventors: Florian Matusek, Vienna (AT); Georg Zankl, Vienna (AT)

(73) Assignee: GENETEC INC.

( * ) Notice: Subject to any disclaimer, the term of this patent is extended or adjusted under 35 U.S.C. 154(b) by 243 days.

(21) Appl. No.: 17/970,673

(22) Filed: Oct. 21, 2022

(65) Prior Publication Data

US 2024/0137601 A1 Apr. 25, 2024
US 2024/0236402 A9 Jul. 11, 2024

(51) Int. Cl.
*H04N 21/431* (2011.01)
*G06T 7/11* (2017.01)
*H04N 21/2187* (2011.01)
*H04N 21/234* (2011.01)

(52) U.S. Cl.
CPC .......... *H04N 21/4318* (2013.01); *G06T 7/11* (2017.01); *H04N 21/2187* (2013.01); *H04N 21/23418* (2013.01); *G06T 2207/10016* (2013.01)

(58) Field of Classification Search
CPC .......... H04N 21/4318; H04N 21/2187; H04N 21/23418; H04N 21/44008; H04N 21/45455; H04N 7/183; G06T 7/11; G06T 2207/10016; G06V 10/25; G06V 20/41; G06V 20/46; G06V 20/52
See application file for complete search history.

(56) References Cited

U.S. PATENT DOCUMENTS

| | | | |
|---|---|---|---|
| 8,150,103 B2 | 4/2012 | Zhang et al. | |
| 8,488,881 B2 | 7/2013 | Feris et al. | |
| 9,123,136 B2 | 9/2015 | Feris et al. | |
| 9,483,952 B2 | 11/2016 | Chew | |
| 9,639,166 B2 | 5/2017 | Meekhof et al. | |
| 10,410,361 B2 | 9/2019 | Zhang et al. | |
| 10,489,660 B2 | 11/2019 | Cao et al. | |
| 10,769,915 B2 * | 9/2020 | Wang | G06V 20/52 |
| 10,880,495 B2 | 12/2020 | Yao | |

(Continued)

FOREIGN PATENT DOCUMENTS

| | | |
|---|---|---|
| CN | 103700116 | 4/2014 |
| CN | 104700430 | 6/2015 |

(Continued)

*Primary Examiner* — Nhan T Tran
(74) *Attorney, Agent, or Firm* — Norton Rose Fulbright Canada

(57) ABSTRACT

Methods, systems, and computer-readable media for producing a privacy-protected video stream are described herein. A request to display a live video stream of a camera is received. The live video stream is received in real-time and comprises a plurality of live image frames from the camera. An archived video stream of the camera is accessed in a data repository. A plurality of archived image frames of the archived video stream is processed to generate a background model comprising imagery common to multiple ones of the plurality of archived image frames. The plurality of archived image frames occurring in time prior to the request to display the live video stream. The privacy-protected video stream is processed in real-time. The privacy-protected video stream is output for display.

21 Claims, 13 Drawing Sheets

(56) References Cited

U.S. PATENT DOCUMENTS

| | | | |
|---|---|---|---|
| 11,082,731 B1 | 8/2021 | Cox et al. | |
| 2008/0123747 A1 | 5/2008 | Lee et al. | |
| 2009/0154565 A1* | 6/2009 | Jeong | H04N 19/503 375/240.16 |
| 2013/0011049 A1 | 1/2013 | Kimura | |
| 2018/0144476 A1 | 5/2018 | Smith | |
| 2018/0255326 A1* | 9/2018 | Oya | H04N 21/4405 |
| 2019/0073813 A1* | 3/2019 | Ito | G06T 3/4038 |
| 2019/0207996 A1 | 7/2019 | Sehgal | |
| 2020/0314356 A1 | 10/2020 | Storer | |
| 2020/0320665 A1* | 10/2020 | Eswara | G06T 7/90 |
| 2021/0383018 A1* | 12/2021 | Keskikangas | G06F 21/6209 |
| 2022/0132048 A1* | 4/2022 | Matusek | G11B 27/28 |
| 2022/0138468 A1* | 5/2022 | Edpalm | H04N 7/18 382/181 |
| 2022/0201253 A1* | 6/2022 | Lundberg | H04N 7/188 |
| 2022/0374635 A1* | 11/2022 | Xiong | G08B 13/19608 |

FOREIGN PATENT DOCUMENTS

| | | |
|---|---|---|
| CN | 105450971 | 3/2016 |
| CN | 107895379 | 4/2018 |
| CN | 110634152 | 12/2019 |
| CN | 109194974 | 12/2020 |
| CN | 113409350 | 9/2021 |
| WO | 2021179036 | 9/2021 |

* cited by examiner

METHODS AND SYSTEMS FOR PRIVACY PROTECTING A LIVE VIDEO STREAM WITH AN ARCHIVED VIDEO STREAM

TECHNICAL FIELD

The present disclosure relates generally to producing privacy-protected video streams, and, more particularly, to methods and systems for privacy protecting a live video stream from a camera using an archived video stream of the camera from a data repository.

BACKGROUND

The use of video cameras to monitor both private and public areas for security purposes is widespread. Video surveillance systems can produce video in which individuals and other identifiable information are clearly recognisable. This raises privacy concerns and leads to opposition to the use of video surveillance, even though such systems can be instrumental in combatting crime and terrorism. In turn, this has led to the adoption of techniques for modifying surveillance video to protect the privacy of individuals and other identifiable information.

Protecting privacy of a video stream by obscuring movement in video is often based on learning a background model of the background in the scene captured by the camera. However, learning a background model requires processing time to reliably distinguish the background from the foreground. Typically, this requires an initial time to learn the background model and continuous processing to update the background model to adjust for any changes with time to the background. This consumes significant computing resources and is a requirement which grows with the number of cameras used in the system.

As such, there is room for improvement.

SUMMARY

The present disclosure is generally drawn to methods, systems, and computer-readable media for on-demand privacy protecting a live video stream from a camera requested for display using an archived video stream from a data repository for the same camera.

Conventionally learning a background model is a time consuming process, as it is usually learned over a minute or longer. Different methods exist that build a background model over time, such as those described in Garcia-Garcia et al. "Background Subtraction in Real Applications: Challenges, Current Models and Future Directions", Computer Science Review, 2020, the contents of which is hereby incorporated by reference. These conventional methods typically require a certain number of image frames to be processed before a background is ready or usable. With conventional approaches, if the number of frames is too low, the model is usually of poor quality, and may contain identifiable information. In the most extreme case, a model could be a single image and causes any person present at the time to be directly identifiable in that image. The more data that is aggregated into a single background model (of limited size), the more the relevant data (the appearance of the background of the scene) remains while identifiable information becomes obscured.

In order to apply privacy protection on-demand when a live video stream is requested, and in contrast with conventional approaches, one or more different mechanisms are needed that only use processing power when it is necessary and/or perform privacy protection only on a video stream once it is requested, rather than all the time. It is not acceptable to have a user wait for a minute, a typical time for a background model to be learned, before the user can view a live video stream from the time it was requested. At the same time, reducing the learning time increases the likelihood that personal identifiable information is present in the background model and thus potentially could be viewable. The present disclosure describes several methods to create a background model for on-demand privacy protection that minimize the effective learning time to provide live privacy-protected video in real-time to the user with minimum delay from the time of the request to display the video.

By way of a first specific and non-limiting example, when a live video stream for a camera is requested, a background model can be learned in faster-than-real-time with archived image frames, from an archived video stream of the same camera, for a definable timeframe (e.g., 1 minute) before the time of request to display the live video stream, and applied to the live video stream to generate a privacy-protected video stream in real-time.

By way of a second specific and non-limiting example, when a live video stream for a camera is requested, a background model can be learned with archived image frames from a previous time of the recording (e.g., longer than 10 minutes ago) of the archived video stream, and applied to the live video stream to generate a privacy-protected video stream in real-time. For instance, this reduces the likelihood that a person currently in the scene is being learned as part of the background. The archived image frames may be selected from a fixed interval (e.g. one frame per minute), or using a selection criteria (e.g. low number of people/vehicles present), or using a classifier to select frames that are suitable, or using a regressor to score frames and pick the best among a selection.

By way of a third specific and non-limiting example, a background model can be learned and applied to a live video stream according to either one of the first and second examples, but wherein person and/or vehicle detectors are used to exclude any area in the archived images frames that includes persons or vehicles. This avoids having any persons or vehicles as part of the background model. The person and/or vehicle detectors act as an additional assurance that no identifiable information is present in the frame.

By way of a fourth specific and non-limiting example, a background model can be learned and applied to a live video stream according to either one of the first and second examples, but wherein person and/or vehicle detectors are used to stitch together a background model from portions of the archived image frames that do not contain any persons or vehicles and this is used as a basis for a continuously updated background model.

By way of a fifth specific and non-limiting example, in any one of the first to fourth examples, or on its own, the background model can be stored from a previous time that a given camera was requested and the previously stored background model can be used as a basis to continuously update the background model. This refers to the concept of storing a "state" of the background model to be re-used at a later time.

By way of a sixth specific and non-limiting example, in any one of the first to fourth examples, or on its own, the learning of the background models is done with a background process that periodically creates and updates background models for any camera that can be used as a basis once the camera feed is being requested.

In accordance with an aspect of the present disclosure, there is provided a computer-implemented method for producing a privacy-protected video stream. The method comprises receiving a request to display a live video stream of a camera. The method comprises receiving the live video stream in real-time comprising a plurality of live image frames from the camera. The method comprises accessing an archived video stream of the camera in a data repository and processing a plurality of archived image frames of the archived video stream to generate a background model comprising imagery common to multiple ones of the plurality of archived image frames. The plurality of archived image frames occurring in time prior to the request to display the live video stream. The method comprises producing the privacy-protected video stream in real-time by: performing a comparison between the background model and each live image frame of the plurality of live image frames of the live video stream to identify one or more privacy protection candidate zones in each live image frame of the plurality of live image frames, and obscuring at least one of the one or more privacy protection candidate zones in each live image frame of the plurality of image frames to produce the privacy-protected video stream. The method comprises outputting the privacy-protected video stream for display.

In accordance with an aspect of the present disclosure, there is provided a computing system for producing a privacy-protected video stream. The computing system comprises at least one processor, and at least one non-transitory computer-readable memory having stored thereon program instructions. The program instructions executable by the at least one processor for receiving a request to display a live video stream of a camera. The program instructions executable by the at least one processor for receiving the live video stream in real-time comprising a plurality of live image frames from the camera. The program instructions executable by the at least one processor for accessing an archived video stream of the camera in a data repository and processing a plurality of archived image frames of the archived video stream to generate a background model comprising imagery common to multiple ones of the plurality of archived image frames. The plurality of archived image frames occurring in time prior to the request to display the live video stream. The program instructions executable by the at least one processor for producing the privacy-protected video stream in real-time by: performing a comparison between the background model and each live image frame of the plurality of live image frames of the live video stream to identify one or more privacy protection candidate zones in each live image frame of the plurality of live image frames, and obscuring at least one of the one or more privacy protection candidate zones in each live image frame of the plurality of image frames to produce the privacy-protected video stream. The program instructions executable by the at least one processor for outputting the privacy-protected video stream for display.

In accordance with an aspect of the present disclosure, there is provided a non-transitory computer-readable storage medium having stored thereon program instruction which, when executed, cause at least one processor to receive a request to display a live video stream of a camera; receive the live video stream in real-time comprising a plurality of live image frames from the camera; access an archived video stream of the camera in a data repository and processing a plurality of archived image frames of the archived video stream to generate a background model comprising imagery common to multiple ones of the plurality of archived image frames, the plurality of archived image frames occurring in time prior to the request to display the live video stream; produce the privacy-protected video stream in real-time by: performing a comparison between the background model and each live image frame of the plurality of live image frames of the live video stream to identify one or more privacy protection candidate zones in each live image frame of the plurality of live image frames; and obscuring at least one of the one or more privacy protection candidate zones in each live image frame of the plurality of image frames to produce the privacy-protected video stream; and output the privacy-protected video stream for display.

In some embodiments, the plurality of archived image frames corresponds to a plurality of consecutive image frames in the archived video stream for a defined time period. In some embodiments, the plurality of archived image frames corresponds to a plurality of sets of one or more image frames spaced apart in time in the archived video stream at a fixed interval. In some embodiments, the plurality of archived image frames occurs at a defined offset in time from the request to display the live video.

In some embodiments, the method further comprises processing the archived video stream to identify the plurality of archived image frames as corresponding to image frames meeting a selection criteria. In some embodiments, the program instructions are further executable by the at least one processor for processing the archived video stream to identify the plurality of archived image frames as corresponding to image frames meeting a selection criteria. In some embodiments, the program instruction which, when executed, cause the at least one processor to process the archived video stream to identify the plurality of archived image frames as corresponding to image frames meeting a selection criteria. In some embodiments, the selection criteria is at least one of: a number of detected people in the plurality of archived image frames is below a threshold number of people; a number of detected vehicles in the plurality of archived image frames is below a threshold number of vehicles; and each timestamp of the plurality of archived image frames occurs during a predefined range of time.

In some embodiments, the method further comprises processing the archived video stream to assign a classification to each image frame of a set of image frames of the archived video stream, the set of image frames including the plurality of archived image frames, and selecting the plurality of archived image frames from the set of image frames based on the classification assigned to each image frame of the set of image frames. In some embodiments, the program instructions are further executable by the at least one processor for processing the archived video stream to assign a classification to each image frame of a set of image frames of the archived video stream, the set of image frames including the plurality of archived image frames, and selecting the plurality of archived image frames from the set of image frames based on the classification assigned to each image frame of the set of image frames. In some embodiments, the program instruction which, when executed, cause the at least one processor to process the archived video stream to assign a classification to each image frame of a set of image frames of the archived video stream, the set of image frames including the plurality of archived image frames, and select the plurality of archived image frames from the set of image frames based on the classification assigned to each image frame of the set of image frames.

In some embodiments, the method further comprises processing the archived video stream to assign a score to each image frame of a set of image frames of the archived video stream, the set of image frames including the plurality of archived image frames, and selecting the plurality of archived image frames from the set of image frames based on the score assigned to each image frame of the set of image frames. In some embodiments, the program instructions are further executable by the at least one processor for processing the archived video stream to assign a score to each image frame of a set of image frames of the archived video stream, the set of image frames including the plurality of archived image frames, and selecting the plurality of archived image frames from the set of image frames based on the score assigned to each image frame of the set of image frames. In some embodiments, the program instruction which, when executed, cause the at least one processor to process the archived video stream to assign a score to each image frame of a set of image frames of the archived video stream, the set of image frames including the plurality of archived image frames, and select the plurality of archived image frames from the set of image frames based on the score assigned to each image frame of the set of image frames.

In some embodiments, the method further comprises processing the plurality of archived image frames to detect one or more objects of at least one object type in at least some image frames of the plurality of archived image frames, and masking one or more areas in the plurality of archived image frames corresponding to at least some of the one or more objects detected in the at least some image frames of the plurality of archived image frames, and wherein the background model is generated with the plurality of archived image frames having at least some of the one or more areas masked. In some embodiments, the program instructions are further executable by the at least one processor for processing the plurality of archived image frames to detect one or more objects of at least one object type in at least some image frames of the plurality of archived image frames, and masking one or more areas in the plurality of archived image frames corresponding to at least some of the one or more objects detected in the at least some image frames of the plurality of archived image frames, and wherein the background model is generated with the plurality of archived image frames having at least some of the one or more areas masked. In some embodiments, the program instruction which, when executed, cause the at least one processor to process the plurality of archived image frames to detect one or more objects of at least one object type in at least some image frames of the plurality of archived image frames, and mask one or more areas in the plurality of archived image frames corresponding to at least some of the one or more objects detected in the at least some image frames of the plurality of archived image frames, and wherein the background model is generated with the plurality of archived image frames having at least some of the one or more areas masked. In some embodiments, the at least one object type is at least one of people and vehicles.

In some embodiments, the method further comprises processing the archived video stream to detect one or more objects of at least one object type in the archived video stream, and selecting the plurality of archived image frames to have regions in the plurality of archived image frames with the one or more objects excluded therefrom, and wherein the background model is generated based on combing the regions of the plurality of archived image frames to have the one or more objects excluded therefrom. In some embodiments, the program instructions are further executable by the at least one processor for processing the archived video stream to detect one or more objects of at least one object type in the archived video stream, and selecting the plurality of archived image frames to have regions in the plurality of archived image frames with the one or more objects excluded therefrom, and wherein the background model is generated based on combing the regions of the plurality of archived image frames to have the one or more objects excluded therefrom. In some embodiments, the program instruction which, when executed, cause the at least one processor to process the archived video stream to detect one or more objects of at least one object type in the archived video stream, and select the plurality of archived image frames to have regions in the plurality of archived image frames with the one or more objects excluded therefrom, and wherein the background model is generated based on combing the regions of the plurality of archived image frames to have the one or more objects excluded therefrom. In some embodiments, the at least one object type is at least one of people and vehicles.

In some embodiments, the request is a first request and the privacy-protected video stream is a first privacy-protected video stream. In some embodiments, the method further comprises storing the background model in computer-readable memory for retrieval when the first privacy-protected video stream is no longer being displayed, receiving a second request to display the live video stream of the camera, the second request occurring after the first request, retrieving from the computer-readable memory the background model for the camera that was generated when the first privacy-protected video stream was displayed, producing a second privacy-protected video stream by processing the live video stream with the background model that was generated when the first privacy-protected video stream was displayed, and outputting the second privacy-protected video stream for display. In some embodiments, the program instructions are further executable by the at least one processor for storing the background model in computer-readable memory for retrieval when the first privacy-protected video stream is no longer being displayed, receiving a second request to display the live video stream of the camera, the second request occurring after the first request, retrieving from the computer-readable memory the background model for the camera that was generated when the first privacy-protected video stream was displayed, producing a second privacy-protected video stream by processing the live video stream with the background model that was generated when the first privacy-protected video stream was displayed, and outputting the second privacy-protected video stream for display. In some embodiments, the program instruction which, when executed, cause the at least one processor to store the background model in computer-readable memory for retrieval when the first privacy-protected video stream is no longer being displayed, receive a second request to display the live video stream of the camera, the second request occurring after the first request, retrieve from the computer-readable memory the background model for the camera that was generated when the first privacy-protected video stream was displayed, produce a second privacy-protected video stream by processing the live video stream with the background model that was generated when the first privacy-protected video stream was displayed, and output the second privacy-protected video stream for display.

In some embodiments, accessing the archived video stream of the camera and processing the plurality of archived image frames to generate the background model comprises periodically accessing each non-displayed video stream of a plurality of video streams of a plurality of cameras, the plurality of video streams including the archived video stream of the camera, and processing each one of the plurality of video streams to generate a respective background model for each of the plurality of cameras, and storing each respective background model in computer-readable memory. In some embodiments, the method further comprising: retrieving the background model for the camera from the computer-readable memory based on the request to display the live video stream of the camera. In some embodiments, the program instructions are further executable by the at least one processor for retrieving the background model for the camera from the computer-readable memory based on the request to display the live video stream of the camera.

In some embodiments, the program instruction which, when executed, cause the at least one processor to access the archived video stream of the camera and processing the plurality of archived image frames to generate the background model comprises program instruction which, when executed, cause the at least one processor to periodically access each non-displayed video stream of a plurality of video streams of a plurality of cameras, the plurality of video streams including the archived video stream of the camera, and process each one of the plurality of video streams to generate a respective background model for each of the plurality of cameras, and store each respective background model in computer-readable memory. In some embodiments, the program instruction which, when executed, cause the at least one processor to retrieve the background model for the camera from the computer-readable memory based on the request to display the live video stream of the camera.

In some embodiments, accessing the archived video stream of the camera in the data repository comprises: identifying, based on the request to display the live video stream of the camera, a location for the archived video stream in the data repository that has stored therein archived video streams from multiple cameras. In some embodiments, the program instruction which, when executed, cause the at least one processor to access the archived video stream of the camera in the data repository comprises program instruction which, when executed, cause the at least one processor to identify, based on the request to display the live video stream of the camera, a location for the archived video stream in the data repository that has stored therein archived video streams from multiple cameras.

In some embodiments, the plurality of archived image frames corresponds to a plurality of I-frames in the archived video stream that can be decoded without other image frames of the archived video stream and are periodically within the archived video stream for starting points of decoding the archived video stream. In some embodiments, the background model is generated without decoding the plurality of archived image frames. In some embodiments, the background model is generated without any information from the plurality of live image frames of the live video stream. In some embodiments, the background model is generated in faster-than-real-time such that a processing time to generate the background model is less than a total length of playback time of the plurality of archived image frames used to generate the background model.

Any of the above features may be used together in any suitable combination.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
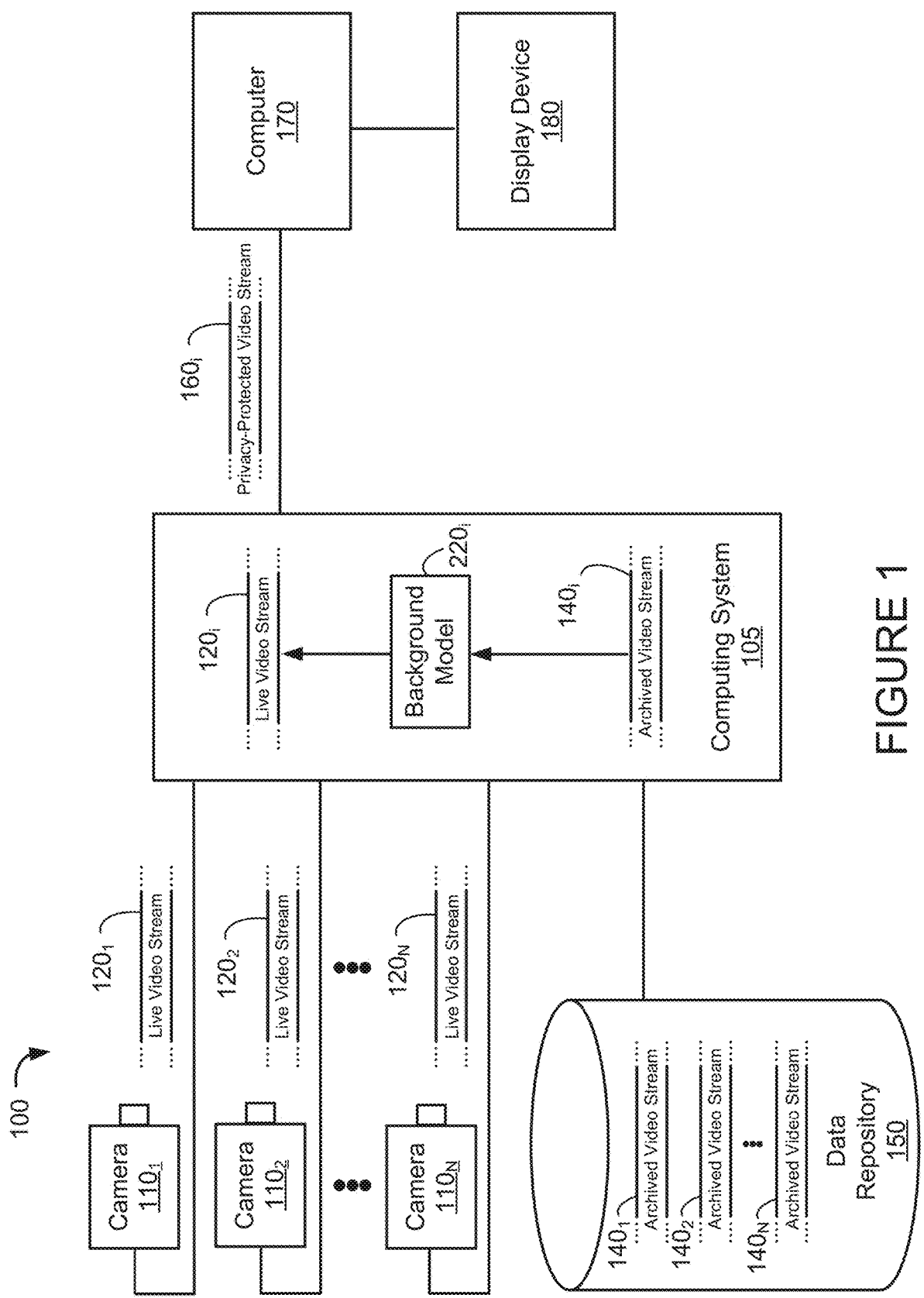
FIG. 1 is a block diagram of an example environment illustrating a computing system for producing a privacy-protected video stream, in accordance with one or more embodiments.

With reference to FIG. 1, there is illustrated an example environment 100 for producing one or more privacy-protected video streams with a computing system 105. The computing system 105 can be configured to communicate with a plurality of video cameras $110_{1, 2 \ldots N}$ to receive therefrom a plurality of live video streams $120_{1, 2, \ldots N}$. The computing system 105 can be configured to produce a privacy-protected video stream $160_i$ of a requested live video stream $120_i$. The privacy-protected video stream $160_i$ can be produced using a corresponding archived video stream $140_i$ of the requested live video stream $120_i$, which is obtained from a data repository 150 storing a plurality of archived video streams $140_{1, 2 \ldots N}$ of the plurality of video cameras $110_{1, 2 \ldots N}$. The request for the display of a given video stream $120_i$ may be received from a computer 170 and the privacy-protected video stream $160_i$ may be output by the computing system 105 to the computer 170 for display on a display device 180.

Figure 2A:
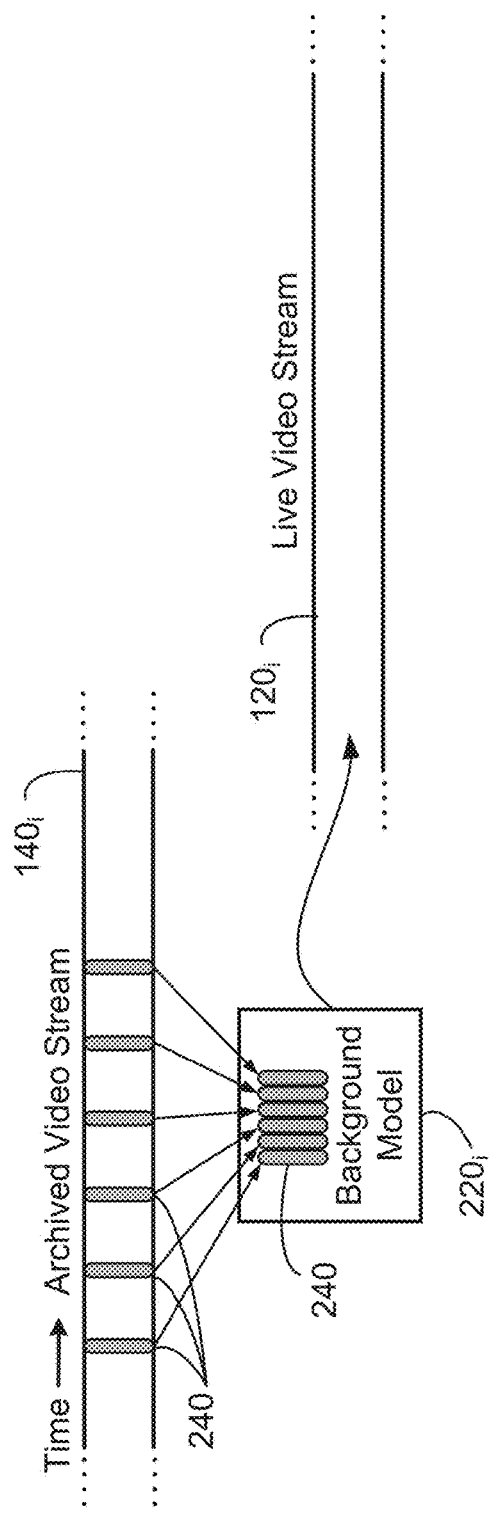
FIG. 2A is a diagram illustrating an example of generating a background model for a live video stream from an archived video stream using archived image frames spaced apart in time, in accordance with one or more embodiments.
Figure 2B:
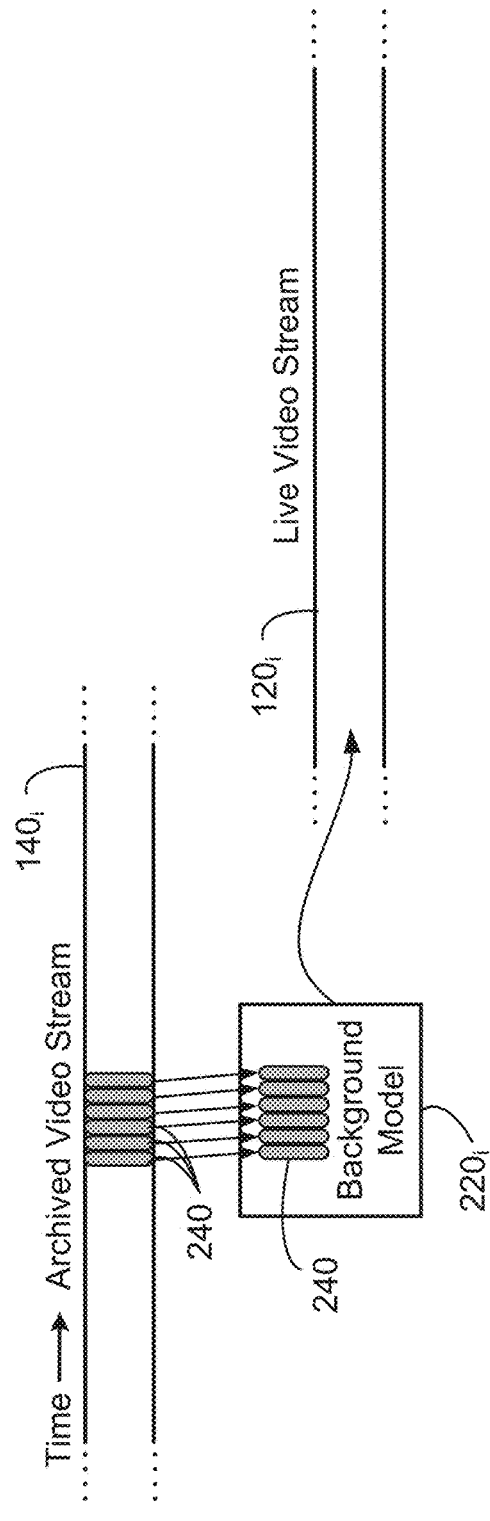
FIG. 2B is a diagram illustrating an example of generating a background model for a live video stream from an archived video stream using consecutive archived image frames, in accordance with one or more embodiments.

With additional reference to FIGS. 2A and 2B, two examples illustrate the generation of a background model $220_i$ for a live video stream $120_i$ from a corresponding archived video stream $140_i$, and applying the background model $220_i$ to the live video stream $120_i$ to produce the privacy-protected video stream $160_i$. When a request is received to display a live video stream $120_i$ of a particular camera $110_i$ of the multiple video cameras $110_{1, 2 \ldots N}$, an archived video stream $140_i$ corresponding to the particular camera $110_i$ is accessed in the data repository 150, and a plurality of archived image frames 240 of the archived video stream $140_i$ are processed to generate the background model $220_i$ for the requested live video stream $120_i$. The archived image frames 240 that are used to produce the background model $220_i$ occur in time prior to the request to display the live video stream $120_i$. In some embodiments, the archived image frames 240 can be spaced apart in time, as shown in FIG. 2A. In some embodiments, the archived image frames 240 can be consecutive archived image frames, as shown in FIG. 2B. The background model can be considered as being generated from archived image frames 240 from a first source (i.e., image frames from a data repository 150) and then being applied to live image frames from a second source (i.e., image frames from a camera $110_i$) to produce the privacy-protected video stream $160_i$. It should be appreciated that because the image frames used to generate the background model $220_i$ are archived image 240 frames from a data repository 150, rather than live image frames from the live video stream $120_i$ itself, that these archived image frames 240 can be processed in faster-than-real-time to generate a background model $220_i$. For example, one (1) minute of archived image frames 240 can be processed in significantly less time than one (1) minute in order to generate a background model $220_i$ that can then be used to produce the privacy-protected video stream $160_i$ of the live video stream $120_i$ requested by a user with minimum delay from the time of the user's request.

Referring back to FIG. 1, the computing system 105 may be one or more computers, a server, a server cluster, a mainframe, a computing cluster, a cloud computing system, a distributed computing system, a portable computing device, or the like. The computing system 105 comprises at least one processing unit and at least one memory that has stored thereon program instructions executable by the at least one processing unit for performing the methods, processes, and/or the various embodiments described herein. The computing system 105 comprises one or more data interfaces and/or one or more network interfaces for communicating with any of the cameras 110, the data repository 150, the computer 170, the display device 180, and/or any other suitable device(s). Any communication between the computing system 105 and the data repository 150, the computer 170, the display device 180, and/or any other suitable device(s), may be over one or more networks, which may comprises one or more public networks (e.g., the Internet) and/or one or more private networks. The network(s) may comprise one or more of a personal area network (PAN), local area network (LAN), mesh network, metropolitan area network (MAN), wide area network (WAN), wireless network, Wi-Fi network, Bluetooth network, cellular network and/or any other suitable network(s).

The data repository 150 stores data, such as video stream data received from cameras $110_{1, 2 \ldots N}$. The computing system 105 and the data repository 150 may be connected directly or via one or more networks, as mentioned elsewhere. In some embodiments, the computing system 105 comprises the data repository 150. In some embodiments, the data repository 150 is separate from the computing system 105. The data repository 150 may be a cloud-based storage system. The data repository 150 comprises computer-readable memory for storing data, such as video stream data. A given archived video $140_i$ stream may be stored in the data repository 150 in association with a camera identifier of the camera $110_i$ corresponding to the archived video stream $140_i$. A given archived video stream $140_i$ may be stored in the data repository 150 in association with a video stream identifier of the archived video stream $140_i$. The archived video streams $140_{1, 2 \ldots N}$ can be stored in the data repository 150 in any suitable manner.

The cameras $110_{1, 2 \ldots N}$ may each be an Internal Protocol (IP) camera or any suitable camera for capturing images and generating a video stream (e.g., security video footage) comprising a plurality of image frames. Each one of the cameras $110_{1, 2 \ldots N}$ comprises at least one optical sensor that detects and conveys information used to produce images frames. The computing system 105 and the cameras $110_{1, 2 \ldots N}$ may be connected directly or via one or more networks, as mentioned elsewhere. Each one of the cameras $110_{1, 2 \ldots N}$ can provide the computing system 105 with a respective live video stream $120_i$ comprises a plurality of live image frames. A "live video stream" refers to a video stream comprising image frames received in real-time or near real-time from the time of recording. Any processing and/or reception that occurs in "real-time" or "near real-time" can include any transmission delay, system propagation delay, processing delay and/or the like. The camera 102 may be a static (i.e., non-moving) camera that captures a physical scene with various moving and/or non-moving objects. The live video streams $120_{1, 2, \ldots N}$ may be received at the computing system 105 and stored in the data repository 150 as archived video streams $140_{1, 2, \ldots N}$. As live image frames of a given live video stream $120_i$ are received each live image frame can be stored as an archived image frame in the data repository 150. The camera identifier of a given camera $110_i$ for a given live video stream $120_i$ may be used to store the image frames in the data repository 150 in the appropriate archived video stream for that camera identifier. The video stream identifier of a given live video stream $120_i$ may be used to store the image frames in the data repository 150 in the appropriate archived video stream $140_i$ for that video stream identifier. The frames can be stored on a frame-by-frame basis or can be stored in blocks of multiple frames (e.g., a minute of frames may be stored at a time). In some embodiments, the live video streams $120_{1, 2, \ldots N}$ may be transmitted from the cameras $110_{1, 2 \ldots N}$ to the data repository 150 for storage without transmission via the computing system 105, which may occur over one or more networks and/or over other computing devices.

The computing system 105 may be connected to the computer 170 for communication therebetween, which may be over one or more networks, for example, as described elsewhere or a direct connection. The computer 170 may be any suitable computing device such as a workstation, a portable computer, a tablet, smart phone, laptop or the like. The computer 170 provides a user interface for interacting and/or controlling the computing system 105. The computer 170 may allow a user to request and view live video streams, among other things. The computer 170 comprises one or more processing units and memory and may independently run software for performing the methods, or part thereof, described herein. Alternatively, the computer 170 may function largely as a client, e.g., using a web browser or client application, while relying, for the most part, on the computing system 105 to perform methods described herein. The computing system 105 may provide a user interface for interacting therewith, in which case a computer 170 is not necessary. By way of an example, the computer 170 is a workstation running the Genetec™ Security Desk application to connect to the computing system 105 implemented as an on-premises server running the Genetec™ Security Center unified security platform provided by the Applicant. By way of another example, a user may use a web browser of the computer 170 to connect to the computing system 105, such as the Stratocast™ cloud-based video management system provided by the Applicant. Various other configurations of the computing system 105 and the computer 170 are contemplated. The display device 180 may be a cathode ray tube display device, a light emitting diode (LED) display device, a liquid crystal display (LCD) display device, a touch screen, or any other suitable display device. The display device 180 may be connected to the computer 170. The computer 170 may comprise the display device 180. In embodiments where the computer 170 is omitted, the display device 180 may be connected to the computing system 105. In some embodiments, the computing system 105 may comprise the display device 180. The computer 170 may comprise one or more data interfaces and/or one or more network interfaces for communicating with the computer system 105, the display device 180, and/or any other suitable devices. The computer 170 and/or the computer system 105 may be connected to various input and/or output devices (e.g., keyboard, mouse, speakers, microphones, etc.) for interacting and/or controlling the computer 170 and/or the computer system 105.

Figure 3:
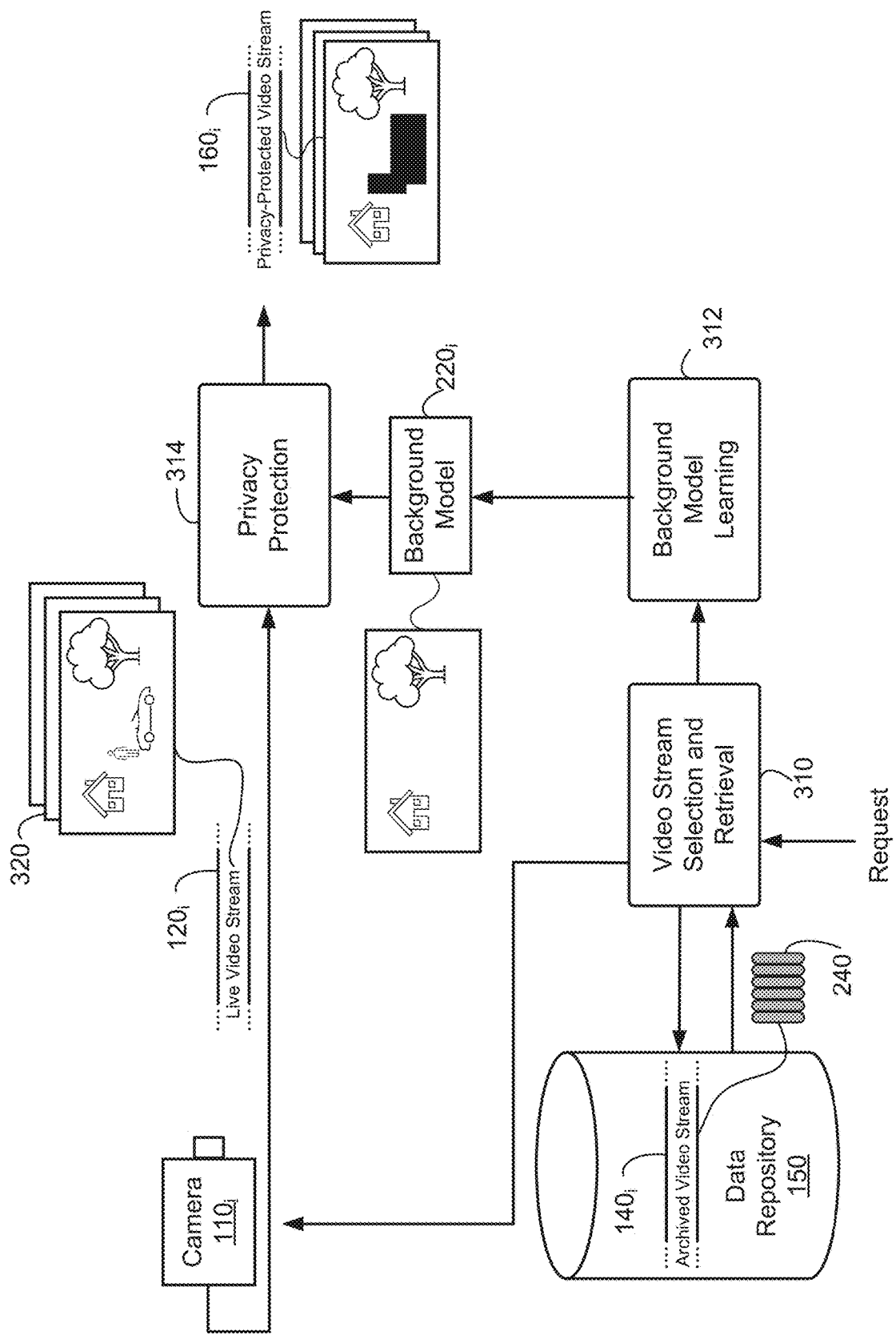
FIG. 3 is a diagram illustrating an example process for producing a privacy-protected live video stream in a computing system, in accordance with one or more embodiments.

With additional reference to FIG. 3, an example process for producing a privacy-protected live video stream $160_i$ at the computing system 105 is illustrated, by reference to various modules 310, 312, 314 of the computing system 105. A video stream selection and retrieval module 310 receives a request to display a live video stream $120_i$ of a particular camera $110_i$. The live video stream $120_i$ for that particular camera $110_i$ is received in real-time. For example, multiple live video streams $120_{1, 2, \ldots N}$ may be received at the computing system 105, and the live video stream $120_i$ for the particular camera $110_i$ that was requested may be identified from the multiple live video streams $120_{1, 2, \ldots N}$ and obtained for performing privacy protection thereon. In some embodiments, the live video stream $120_i$ for the particular camera $110_i$ that was requested may be received in response to the request. For example, the request can includes a camera identifier and the video stream selection and retrieval module 310 can select, based on the camera identifier, which camera $110_i$ of the plurality of cameras $110_{1, 2 \ldots N}$ available to the computing system 105 that the live video stream $120_i$ should be received therefrom. By way of another example, the request can includes a video stream identifier and the video stream selection and retrieval module 310 can select, based on the video stream identifier, which live video stream $120_i$ should be received. In some embodiments, the user interface at the computer 170 provides the user with a listing of available cameras (or video streams) from which the user can select one or more that the user would like to view with privacy protection. When the user selects a camera (or video stream) from the list, the identifier associated with that camera (or video stream) may be transmitted from the computer 170 to computing system 105 in the request. The video stream selection and retrieval module 310 can also use this identifier to identify a corresponding archived video stream $140_i$ in the data repository 150 from the plurality of archived video streams $140_{1, 2 \ldots N}$ stored in the data repository 150 that matches with the identifier. Accordingly, based on the request to display the live video stream $120_i$ of the camera $110_i$, a location for the archived video stream $140_i$ in the data repository 150 that has stored therein the archived video streams $140_{1, 2, \ldots N}$ from multiple cameras $110_{1, 2, \ldots N}$, can be identified. Similarly, based on the request to display the live video stream $120_i$ of the camera $110_i$ from multiple cameras $110_{1, 2, \ldots N}$, the live video stream $120_1$ to be privacy protected can be identified and requested.

The video stream selection and retrieval module 310 can select the plurality of archived image frames 240 of the archived video stream $140_i$ which are to be processed to generate the background model $220_i$, and obtain the archived image frames 240 from the data repository 150. In some embodiments, the archived image frames 240 selected correspond to consecutive image frames in the archived video stream $140_i$ for a defined time period. The defined time period may be any suitable period of time. For example, the defined time period could be 30 seconds, one (1) minute, two (2) minutes, etc. The plurality of consecutive image frames may occur immediately prior to the time of the request. For example, if the request occurs at a relative time of t=0, the immediately prior consecutive image frames could correspond to t=−X to 0, where X is the defined time period. In some embodiments, the plurality of archived image frames $140_i$ corresponds to sets of one or more image frames spaced apart in time in the archived video stream $140_i$ at a fixed interval. For example, one image frame occurring every minute in the archived image stream $140_i$ could be used for a defined period of time, e.g., 10 minutes. By way of another example, multiple consecutive image frames occurring at an fixed interval of time, such as every minute, in the archived image stream $140_i$ could be used for a defined period of time, e.g., 10 minutes. In some embodiments, the plurality of archived image frames $140_i$ occur at a defined offset in time from the time of the request to display the live video stream $120_i$. For example, the defined offset could be 10 minutes prior to the request, 30 minutes prior to the request, 1 day prior to the request, etc. In some embodiments, the plurality of archived image frames $140_i$ corresponds to sets of one or more image frames spaced apart in time in the archived video stream $140_i$ at a varying intervals of time (i.e., non-fixed intervals of time). For example, the intervals of time between the image frames may be randomly selected or may be obtained according to a selection criteria. The selection of which archived image frames 240 in the archived video stream $140_i$ that are to be selected is further described elsewhere in this document.

The background model learning engine 312 processes the archived image frames 240 and generates the background model $220_i$ from the archived image frames 240. The background model $220_i$ corresponds to a model of the background in the scene captured by the camera $110_i$. The background model $220_i$ comprises imagery common to multiple ones of the archived image frames 240. The archived image frames 240 may be combined to form a background training clip, which is input to the background model learning engine 312, or the archived image frames 240 may be input to the background model learning engine 312 separately. The background model learning engine 312 uses an algorithm to produce a background model $220_i$ based on the archived image frames 240. Various methods and algorithms may be used to produce the background model $220_i$.

The processing of the archived image frames 240 to produce the initial background model $220_i$ can be done without use of any information from the live video stream $120_i$. In other words, the background model $220_i$ can be generated from the archived images frames 240 of the archived image stream $140_i$ without any of the live image frames of the live video stream $120_i$. Accordingly, the background model can be generated "on demand" from an archived video stream $140_i$ when a live video stream $120_i$ is requested, i.e., without continuously processing the live video stream $120_i$ to have an up-to-date background model. This is advantageous in that the computing system 105 can rely solely on the archived video stream $140_i$ to produce the initial background model $220_i$, which means that the processing to generate the background model $220_i$ can be carried out in faster-than-real-time and/or can use a small number of selected image frames, resulting in a low amount of processing time, and which can be selected without having to wait for a typical learning period of time to pass.

The methods and algorithms that may be used to produce the background model $220_i$ may include selecting the archived image frames 240 that are well suited for generating a background model $220_i$. Accordingly, the methods and algorithms may include identifying the archived image frames 240 as those corresponding to image frames meeting a selection criteria, and then a conventional method or algorithm for producing a background model may be used. The selection criteria may be that a number of detected people in the archived image frames 240 is below a threshold number of people. The selection criteria may be a number of detected vehicles in the plurality of archived image frames 240 is below a threshold number of vehicles. The selection criteria may be that each timestamp of the plurality of archived image frames 240 occurs during a predefined range of time. For example, if the current time of the request is during the day, then the archived image frames 240 selected may be selected as occurring during day time. The selection criteria may be that the archived images frames 240 are selects as ones without any identifiable information. The selection criteria may be that the archived images frames 240 are selects as ones without any identifiable information of a given type or given types (e.g., one or more of: vehicles, license plate, vehicle identifiers, people, faces, etc.). Any other suitable selection criteria may be used and/or any of the above mentioned selection criteria may be used in combination.

The methods and algorithms that may be used to produce the background model $220_i$ may include using a classifier to classify a set of archived image frames in the archived video stream $140_i$ and then select the archived image frames 240 used to produce the background model $220_i$ based on the classification. A set of archived image frames may be processed with the classifier to generate a classified set of archived image frames. The set of archived image frames may be processed with the classifier to classify (e.g., label) each image frame in the set as either suitable or unsuitable for use in producing a background model. The archived image frames 240 for producing the background model may be selected as a subset of the classified set, which are the ones identified (e.g., labelled) in the classified set as being suitable for use in producing a background model. The classifier can be trained on a training set of images manually labelled as either suitable or unsuitable (or any other like terminology, e.g., good or bad, etc.) such that the classifier would then be able to classify unlabelled images as suitable or unsuitable according to its training based on the training set. The training set can be manually labelled such that images with no identifiable information (e.g., no people, no license plates, etc.) are labelled as suitable and images with identifiable information (e.g., people, license plates, etc.) are labelled as unsuitable. The set of image frames to be classified may be selected in any suitable manner. For example, the set of image frames may be the image frames spaced apart in time in the archived video stream $140_i$ at a fixed interval (e.g., every minute, every hour, etc.) or non-fixed interval (e.g., randomly selected). By way of another example, the set of archived image frames may be consecutive image frames in the archived video stream $140_i$ that occur immediately prior to the request or at a defined offset from the time of the request.

The methods and algorithms that may be used to produce the background model $220_i$ may include using a regressor to score a set of archived image frames in the archived video stream $140_i$ and then select the archived image frames 240 used to produce the background model $220_i$. The set of archived image frames may be processed with the regressor to score each image frame in the set to produce a scored set of archived image frames. Then, the scored set may be ranked, and a threshold number of highest ranking archived image frames may be selected for the producing of the background model therefrom. The threshold number may be any suitable number (e.g., 3, 5, 10, 15, 20, 30, 60, etc.). For example, the regressor could score the image frames on a scale of 0 to 100, where 0 indicates that a given image frame has identifiable information with certainty, and 100 indicates that a given image frame is without identifiable information with certainty, and any value in between indicates the likelihood that an image frame is without identifiable information. The regressor may be implemented in a similar manner to the classifier. A distinction between regression and classification is that in regression the best N (threshold number) image frames can be selected, and in classification a score can be assigned to each image frame and image frames with a score exceeding a threshold value can be selected. It should be appreciated that an advantage of regression is that it can guarantee a result in a certain number of image frames, as a classifier could result in no image frames suitable for producing the background model. The regressor may similarly output an indicator that a given image frame is suitable or unsuitable for use in producing a background model. The regressor may similarly be trained with a training set of images that are manually labelled. The set of archived image frames to be scored with the regressor may be selected in any suitable manner. For example, the sets of archived image frames may be the image frames spaced apart in time in the archived video stream $140_i$ at a fixed interval (e.g., every minute, every hour, etc.) or non-fixed interval (e.g., randomly selected). By way of another example, the set of archived image frames may be consecutive image frames in the archived video stream $140_i$ that occur immediately prior to the request or at a defined offset from the time of the request.

It should be appreciated that by selecting the archived image frames 240 used that a smaller number of input image frames can be used compared to the number of input frames needed in conventional method or algorithm for producing a background model with a similar level of quality and/or without having to wait for a typical learning period of time to pass.

The methods and algorithms that may be used to produce the background model $220_i$ may include selecting only I-frames from the archived video stream $140_i$ to generate the background model $220_i$ therefrom. The I-frames in the archived video stream $140_i$ can be decoded without other image frames of the archived video stream $140_i$. The I-frames are periodically within the archived video stream $140_i$ and are for starting points of decoding the archived video stream $140_i$. In some embodiments, the background model is generated without decoding the archived image frames 240 and/or the archived video stream $140_i$.

The methods and algorithms that may be used to produce the background model $220_i$ may include one or more of a Gaussian mixture model, support vector machines, neural networks, and any other suitable methods or algorithms. The algorithm may include the use of an unsupervised machine-learning technique in combination with any of a number of features extracted from the images of the segments, such as color. In some embodiments, the algorithm is based on the use of a sparse histogram per pixel and color channel as a background model $220_i$. In this approach, the bin location and values of the histogram are updated based on values from the input image. If a value from the input image is close to a bin, the corresponding bin value increases. Bin values continuously decrease and may be replaced with the values from the input image when they fall below a defined value. The determination of where to obscure the input image is done per block, based on a calculated per-pixel difference compared to the model. A determination is made as to how many pixels per block are in a defined range indicating a high degree of difference compared to the model. If the number of pixels per block in the defined high difference range is greater than a defined threshold, then the block is obscured.

The privacy protection engine 314 produces the privacy-protected video stream $160_i$ in real-time. The privacy protection engine 314 performs a comparison between the background model $220_i$ and each live image frame of a plurality of live image frames 320 of the live video stream $120_i$ to identify one or more privacy protection candidate zones in each of the live image frames 320. The background model $220_i$ can act, in effect, as a filter to identify one or more foreground regions that correspond to the one or more privacy protection candidate zones. The one or more foreground regions may indicate foreground objects i.e., objects which in motion and/or changing over time, from the static background of the image frame. For each live image frame of the live video stream $120_i$, the privacy protection engine 314 may perform background subtraction, using the background model $220_i$, to determine the one or more privacy protection candidate zones. Specifically, a given live image frame of the live video stream $120_i$ is compared to the background model $220_i$ to produce a foreground mask which specifies one or more areas of pixels corresponding to the one or more privacy protection candidate zones. The privacy protection engine 314 obscures at least one of the one or more privacy protection candidate zones in each live image frame of the live video stream $120_i$ to produce the privacy-protected video stream $160_i$. In some embodiments, all of the one or more privacy protection candidate zones are obscured. All of the one or more privacy protection candidate zones can be obscured without any further processing to identify which ones of the one or more privacy protection candidate zones are to be obscured. Accordingly, the one or more privacy protection candidate zones can corresponds to one or more foreground regions, and all of which can be obscured. In some embodiments, the one or more privacy protection candidate zones are processed to select which ones of the one or more privacy protection candidate zones are to be obscured. For example, each of the one or more privacy protection candidate zones may be processed to detect the presence of an object of a given type (e.g., people, vehicles, etc.), and the one or more privacy protection candidate zones having the object of the given type can then be selected to be obscured. The one or more privacy protection candidate zones that are to be obscured, can be obscured in any suitable manner. For example, the obscuring of the privacy protection candidate zones may be by pixelizing the one or more privacy protection candidate zones. Pixelizing typically involves assigning an average color value to image blocks. Various other processes can be used for obscuring foreground regions, such as colorizing (i.e., assigning a defined color to image blocks), blurring, and inverting (i.e., inverting color values of image blocks). The resulting output is the privacy-protected video stream $160_i$.

It should be appreciated that the processing of the archived image frames 240 to generate the background model $220_i$ can be performed in faster-than-real-time as these image frames are obtained from the archived video stream $140_i$ stored in the data repository 150, rather than from the live video stream $120_i$ itself. For example, if one (1) minute of archived image frames are used to generate the background model $220_i$, the processing time to generate the background model $220_i$ would be less than one (1) minute. This in turn allows for the live privacy-protected video stream $160_i$ to be provided in real-time with a minimum delay from the time of the request to display this video. In general, the delay from the time of the request corresponds to the processing time to produce the background model $220_i$, the processing time to apply the background model $220_i$ to the live video stream $120_i$, and any other time to obtain the live video stream $120_i$ and the plurality of archived image frames 240 of the archived video stream $140_i$. In contrast, if one (1) minute of a live video stream were to be processed to generate a background model, it would take at least one (1) minute to generate the background model, as the system would have to wait for the one (1) minute of live video to occur.

Figure 4:
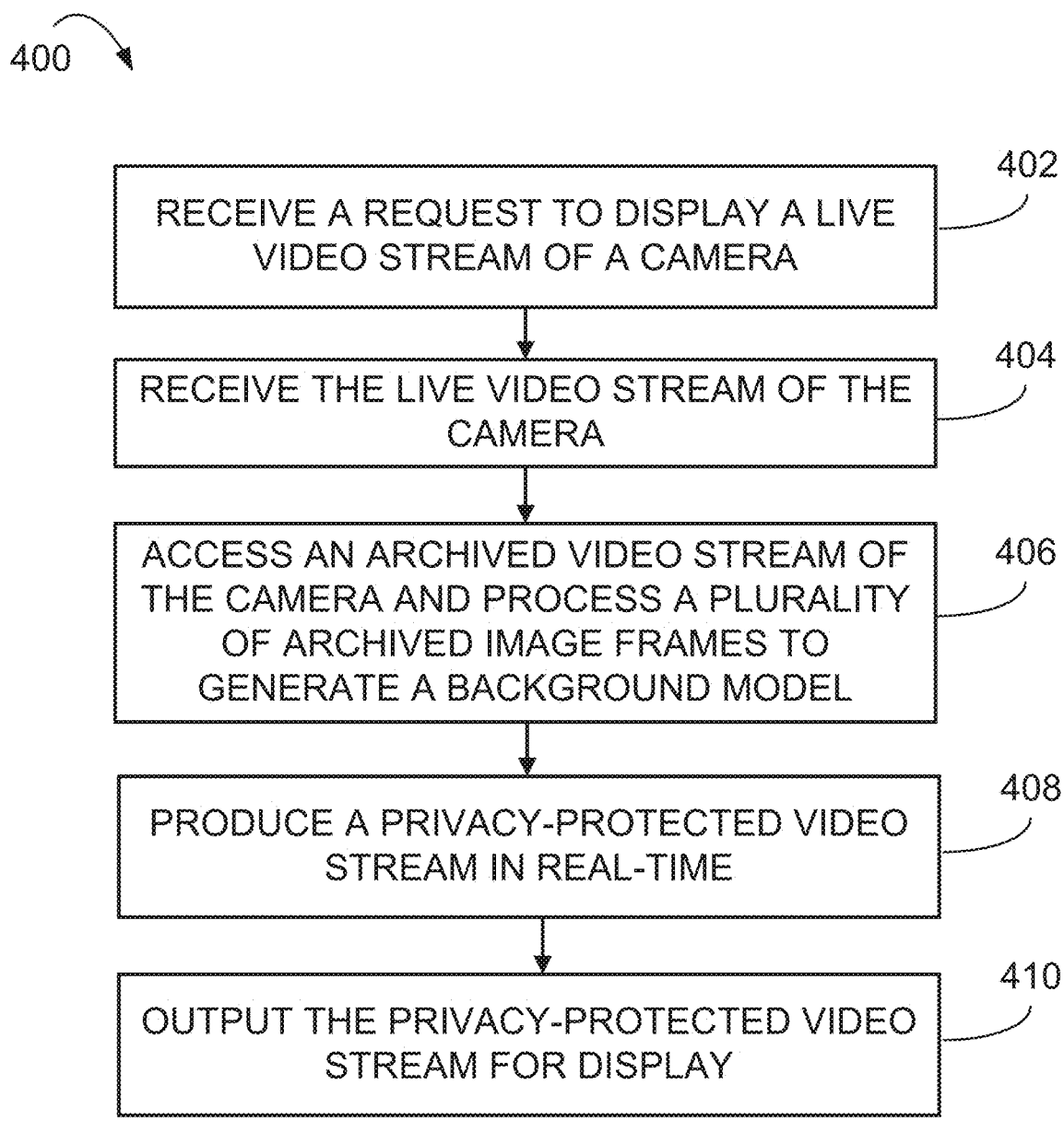
FIG. 4 is a flowchart illustrating an example method for producing a privacy-protected video stream, in accordance with one or more embodiments.

With reference to FIG. 4, there is shown a flowchart illustrating an example method 400 for producing a privacy-protected video stream. The method 300 is performed by a computing device, such as the computing system 105, or by any other suitable computing device, system or the like. In explanation of the method 400, any reference to the environment 100 of FIG. 1, the generation of the background models of FIGS. 2A and 2B, and the process and modules/engine of the computing system 105 of FIG. 3, is made for example purposes, and the environment, background model generation, and the computing system's implementation, may vary depending on practical implementations.

At step 402, a request to display a live video stream $120_i$ of a camera $110_i$ is received. The request may be received at the computing system 105 from the computer 170. The request may be request for a particular camera $110_i$ of multiple cameras $110_{1, 2, \ldots N}$. The request may comprise an identifier indicative of the camera $110_i$ from which the live video stream $120_i$ is to be displayed with privacy protection. For example, the request may comprise an identifier of the camera $110_i$ from which the live video stream $120_i$ is to be displayed with privacy protection. By way of another example, the request may comprise an identifier of the live video stream $120_i$ that is to be displayed with privacy protection. The request to display the live video stream $120_i$ of the camera $110_i$ may be a selection from multiple cameras $110_{1, 2 \ldots N}$ and/or live video streams $120_{1, 2 \ldots N}$ that are available to be selected for live video display.

At step 404, the live video stream $120_i$ is received in real-time. The live video stream $120_i$ comprises a plurality of live image frames 320 from the camera $110_i$. The live video stream $120_i$ may be received at the computing system 105. The live video stream $120_i$ may be received automatically from the camera $110_i$, for example over a network. For example, the computing system 105 may be a video management system (VMS) or a network video archiver that is configured to receive multiple live video streams $120_{1, 2, \ldots N}$ from multiple cameras $110_{1, 2, \ldots N}$. Based on the request to display the live video stream $120_i$ of the camera $110_i$ from multiple cameras $110_{1, 2, \ldots N}$, the live video stream $120_1$ to be privacy protected can be identified from among multiple live video streams $120_{1, 2, \ldots N}$, and obtained for performing privacy protection thereon. The live video stream $120_i$ may be received based on the request to display the live video stream $120_i$ of the camera $110_i$. The identifier indicative of the camera $110_i$ from which the live video stream $120_i$ is to be displayed with privacy protection provided in the request at step 402, may be used to identify and request (or obtain) the live video stream $120_i$. For example, the live video stream $120_i$ may be requested using the identifier provided at step 402 from the camera $110_i$, from memory or storage, such as the data repository 150, or any other suitable computer readable memory/medium or intermediary device (e.g., VMS, network video archived, etc.), as the live video stream $120_i$ may be stored and/or received elsewhere prior to being received at step 404. By way of another example, the live video stream $120_i$ may be obtained using the identifier provided at step 402 from among a plurality of live video streams $120_{1, 2, \ldots N}$ that are being received.

At step 406, an archived video stream $140_i$ of the camera $110_i$ in a data repository 150 is accessed and a plurality of archived image frames 240 of the archived video stream $140_i$ is processed to generate a background model $220_i$. The background model $220_i$ comprises imagery common to multiple ones of the plurality of archived image frames 240. The plurality of archived image frames 240 occur in time prior to the request to display the live video stream $120_i$. The background model $220_i$ corresponds to a model of the background in the scene captured by the camera $110_i$. In some embodiments, the background model $220_i$ is a background image that is generated from the plurality of archived image frames 240. In some embodiments, the background model $220_i$ is a computer-implemented model or data structure that models the background of the scene captured by the camera $110_i$. For example, the background model $220_i$ may be a statistical model, which can be per pixel, like mean color and variance, or a histogram of observed colors for each pixel. The background model $220_i$ may be generated on-demand based on the request of step 402. For example, the identifier indicative of the camera $110_i$ from which the live video stream $120_i$ is to be displayed with privacy protection provided in the request at step 402, may be used to identify the archived video stream $140_i$ in the data repository 150 from among multiple archived video streams $140_{1, 2, \ldots N}$ that the plurality of archived image frames 240 are to be obtained therefrom for generating the background model $220_i$. Accordingly, the background model $220_i$ may be initially generated without continuously processing the live video stream $120_i$. The selection of the plurality of archived image frames 240 that are to be used to generated the background model $220_i$ may be as described elsewhere in this document. The background model $220_i$ can be generated in faster-than-real-time, as the background model can be generated in less processing time than the total length of playback time of the archived image frames 240 used to generate the background model $220_i$. The background model $220_i$ can be generated in any suitable manner, and may be generated as described elsewhere in this document, such as in relation to the background model learning engine 312 of FIG. 3.

Figure 5:
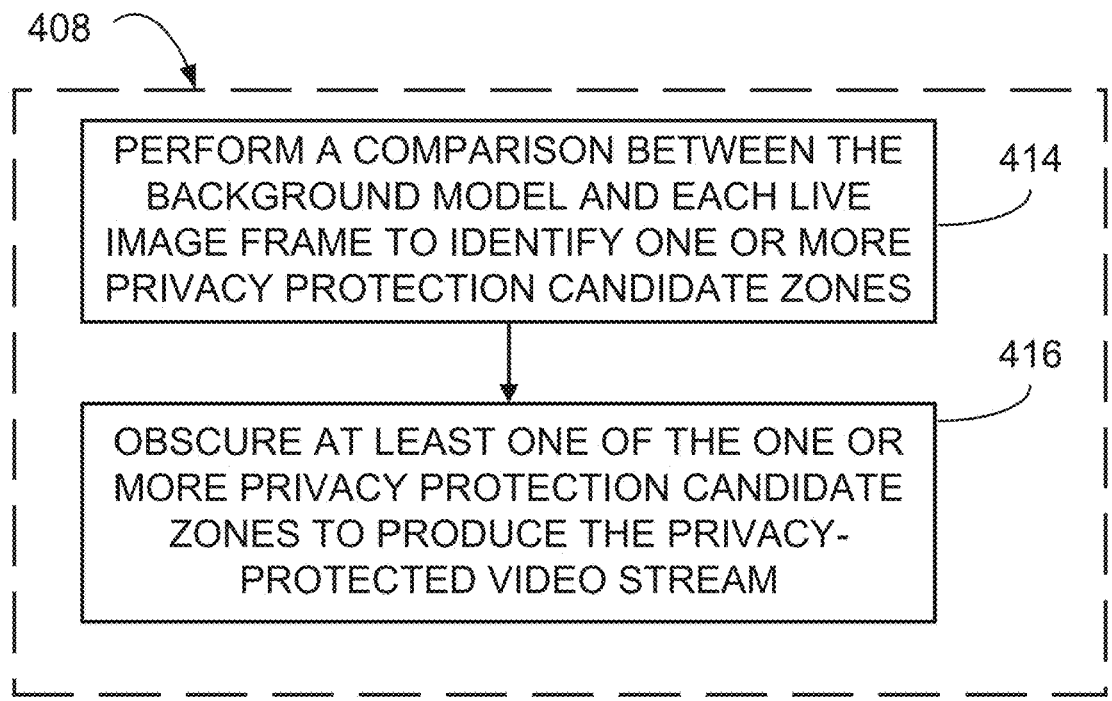
FIG. 5 is a flowchart illustrating an example of the step of producing the privacy protected video stream of the method of FIG. 4, in accordance with one or more embodiments.

At step 408, a privacy protected video stream $160_i$ is produced in real-time. The live video stream $120_i$ is privacy protected to produce the privacy protected video stream $160_i$. The live video stream $120_i$ is privacy protected by applying the background model $220_i$, which was generated from the plurality of archived image frames 240 of the archived video stream $140_i$, to live video stream $120_i$. With additional reference to FIG. 5, there is shown a flowchart illustrating an example for producing the privacy protected video stream $160_i$ at step 408 of the method 400. At step 414, a comparison between the background model $220_i$ and each live image frame of the plurality of live image frames of the live video stream $120_i$ is performed to identify one or more privacy protection candidate zones in each live image frame of the plurality of live image frames. In some embodiments, step 414 comprises performing background subtraction using the background model $220_i$ to identify one or more foreground regions. Accordingly, the identified one or more foreground regions can correspond to the one or more privacy protection candidate zones. At step 416, at least one of the one or more privacy protection candidate zones in each live image frame of the plurality of image frames is obscured to produce the privacy-protected video stream $160_i$. In some embodiments, step 416 comprises obscuring each of the identified one or more foreground regions. In some embodiments, step 416 comprises processing the one or more privacy protection candidate zones to select which ones of the one or more privacy protection candidate zones that are to be obscured. Referring back to FIG. 4, the privacy-protected video stream $160_i$ can be produced at step 408 as described elsewhere in this document, for example, as described in relation to privacy protection engine 314 of FIG. 3. The privacy protected video stream $160_i$ may be produced by, for each live image frame of the plurality of live image frames of the live video stream $120_i$, performing background subtraction, using the background model $220_i$, to identify foreground regions, and obscuring the foreground regions.

At step 410, the privacy-protected video stream $160_i$ is output for display. For example, the computing system 105 can output the privacy-protected video stream $160_i$ to the computer 170 for display on the display device 180 associated with the computer 170. The privacy-protected video stream $160_i$ may be stored to computer readable memory, such as at the computing system 105, the computer 170, and/or the data repository 150. The privacy-protected video stream $160_i$ may be transmitted to any computing device, such as the computer 170.

Figure 6:
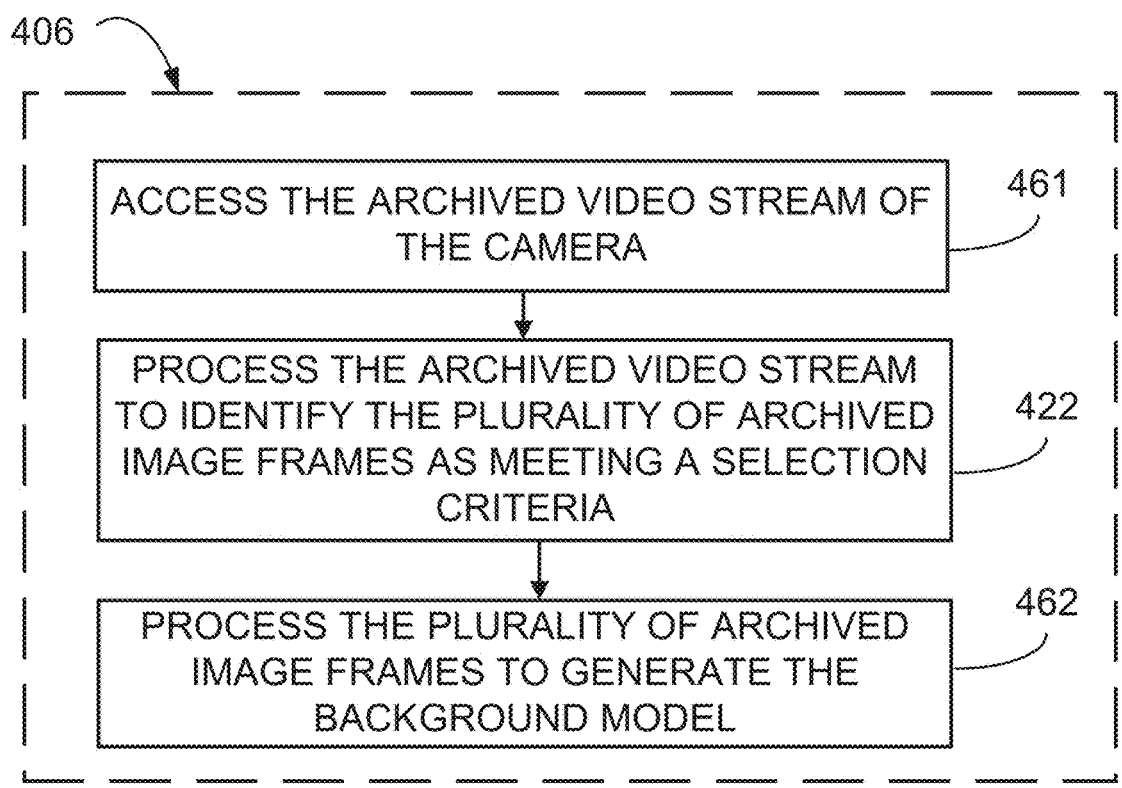
FIG. 6 is a flowchart illustrating an example of the step of generating the background model of the method of FIG. 4 by use of a selection criteria, in accordance with one or more embodiments.

With reference to FIG. 6, there is shown a flowchart illustrating an example of step 406 of the method 400 for accessing the archived video stream $140_i$ of the camera $110_i$ in the data repository 150 and processing the plurality of archived image frames 240 of the archived video stream $140_i$ to generate a background model $220_i$. At step 461, the archived video stream $140_i$ of the camera $110_i$ in the data repository 150 is accessed. Step 461 may be performed as described elsewhere in this document, such as described at step 406 of FIG. 4. At step 422, the archived video stream $140_i$ is processed to identify the plurality of archived image frames 240 as corresponding to image frames meeting a selection criteria. The selection criteria may be that a number of detected people in the plurality of archived image frames 240 is below a threshold number of people. The selection criteria may be that a number of detected vehicles in the plurality of archived image frames 240 is below a threshold number of vehicles. The selection criteria may be that the plurality of archived image frames 240 exclude any vehicle identifiers (e.g., a license plate number, an identification number of an airplane or classified military equipment, etc.) Accordingly, a set of image frames in the archived video stream $140_i$ may be processed to identify objects of a given object type (e.g., people, vehicles, license plates, etc.), and the plurality of archived image frames 240 can be selected from the set as ones meeting the selection criteria. The selection criteria may be that each timestamp of the plurality of archived image frames 240 occurs during a predefined range of time. At step 462, the plurality of archived image frames 240 of the archived video stream $140_i$ is processed to generate the background model $220_i$. Step 462 may be performed as described elsewhere in this document, such as described at step 406 of FIG. 4.

Figure 7:
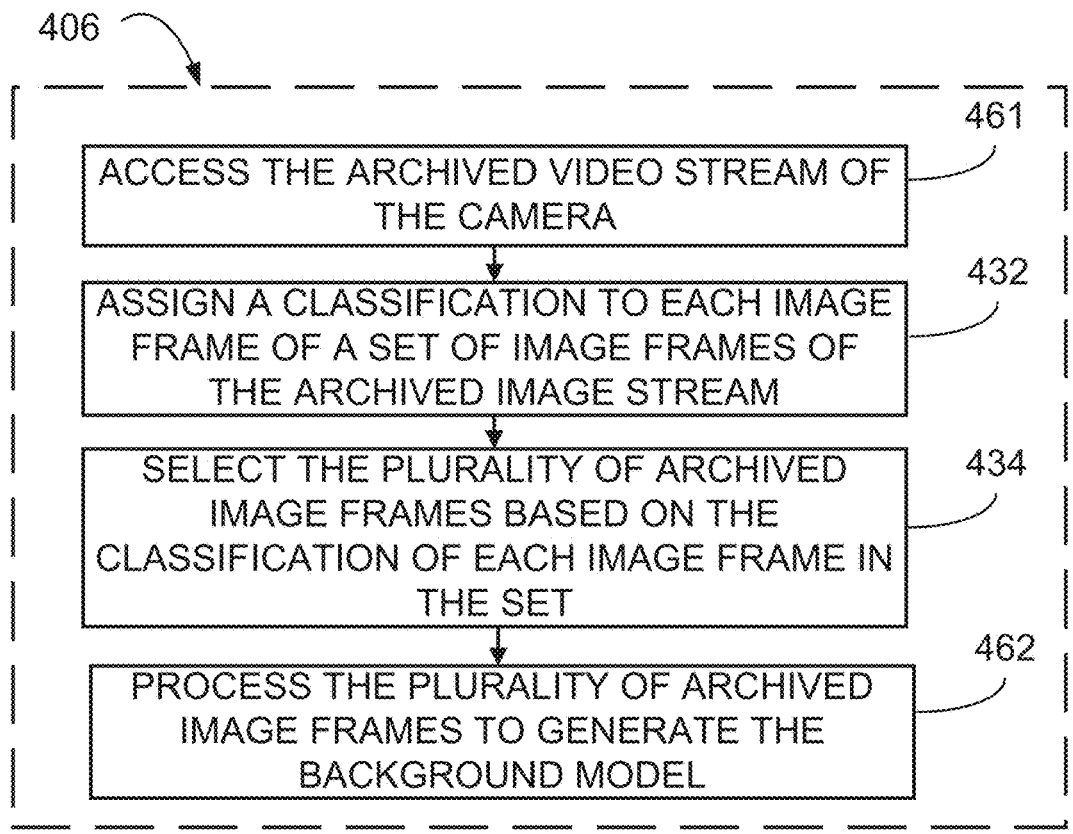
FIG. 7 is a flowchart illustrating an example of the step of generating the background model of the method of FIG. 4 by use of classification of image frames, in accordance with one or more embodiments.

With reference to FIG. 7, there is shown a flowchart illustrating an example of step 406 of the method 400 for accessing the archived video stream $140_i$ of the camera $110_i$ in the data repository 150 and processing the plurality of archived image frames 240 of the archived video stream $140_i$ to generate a background model $220_i$. At step 461, the archived video stream $140_i$ of the camera $110_i$ in the data repository 150 is accessed. Step 461 may be performed as described elsewhere in this document, such as described at step 406 of FIG. 4. At step 432, the archived video stream $140_i$ is processed to assign a classification to each image frame of a set of image frames of the archived video stream $140_i$ to generate a set of classified archived image frames. The classification assigned to a given image frame in the set may indicate that the image is either suitable or unsuitable for use in producing a background model. The "suitable" classification may be assigned to a given image frame when no identifiable information of a given type or types is detected in the given image frame (e.g., no people, no faces, no vehicles, no license plates, etc.). The "unsuitable" classification may be assigned to a given image frame when identifiable information of a given type or types is detected in the given image frame (e.g., people, faces, vehicles, license plates, etc.). The classification assigned at step 432 may be performed by the classifier of the computing system 105, as described elsewhere in this document. The set of image frames to be classified may be selected from the archived video stream $140_i$ in any suitable manner (e.g., image frames spaced apart in time in the archived video stream $140_i$ at a fixed interval or non-fixed interval, consecutive image frames in the archived video stream $140_i$ that occur immediately prior to the request or at a defined offset from the time of the request, etc.). At step 434, the plurality of archived image frames 240 are selected from the set of classified archived image frames based on the classification assigned to each image frame of the set of classified archived image frames. The plurality of archived image frames 240 are selected from the set of classified archived image frames may be all, or may be selected ones, of the image frames in the set of classified archived image frames that are classified as suitable for use in producing a background model.

For example, only a certain number of image frames may be needed to generate the background model $220_i$, and if the number of image frames in the set of classified archived image frames classified as "suitable" exceeds this certain number, then the selection may be limited to that number. As the plurality of archived image frames 240, used to generate the background model $220_i$, is selected from the set of classified archived image frames, the set of classified archived image frames (and the set of image frames pre-classification) includes at least the plurality of archived image frames 240. At step 462, the plurality of archived image frames 240 of the archived video stream $140_i$ is processed to generate the background model $220_i$. Step 462 may be performed as described elsewhere in this document, such as described at step 406 of FIG. 4.

Figure 8:
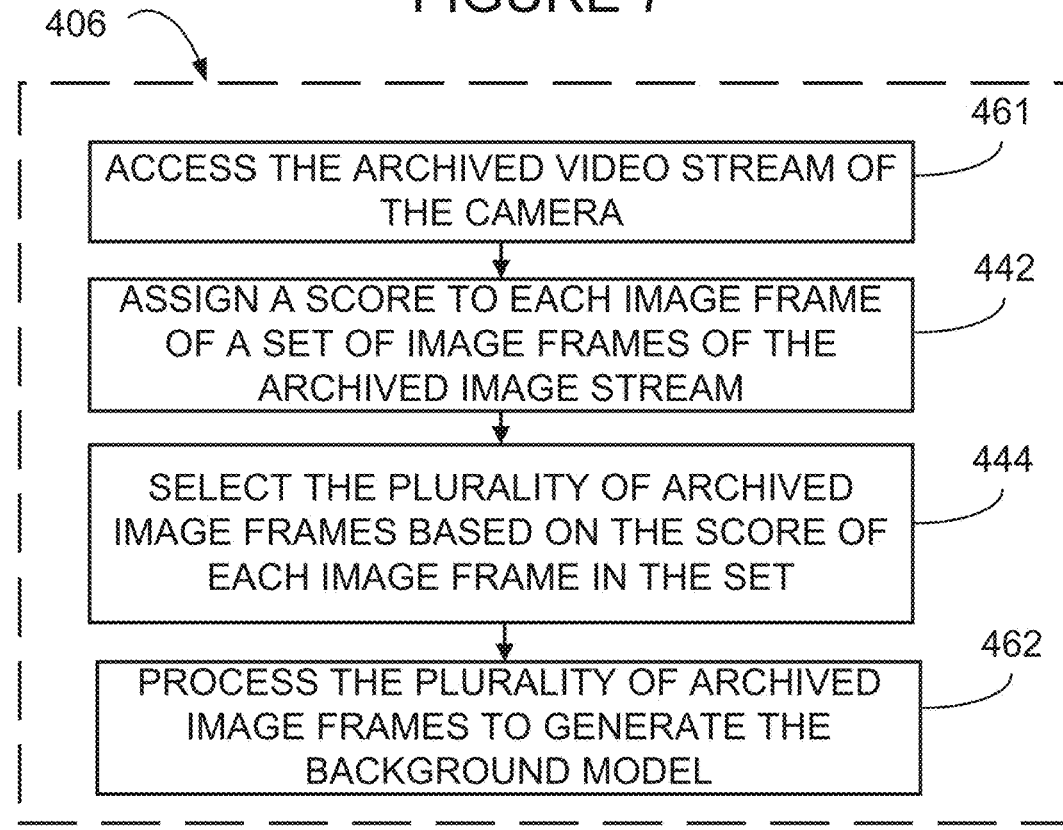
FIG. 8 is a flowchart illustrating an example of the step of generating the background model of the method of FIG. 4 by use of scoring of image frames, in accordance with one or more embodiments.

With reference to FIG. 8, there is shown a flowchart illustrating an example of step 406 of the method 400 for accessing the archived video stream $140_i$ of the camera $110_i$ in the data repository 150 and processing the plurality of archived image frames 240 of the archived video stream $140_i$ to generate a background model $220_i$. At step 461, the archived video stream $140_i$ of the camera $110_i$ in the data repository 150 is accessed. Step 461 may be performed as described elsewhere in this document, such as described at step 406 of FIG. 4. At step 442, the archived video stream $140_i$ is processed to assign a score to each image frame of a set of image frames of the archived video stream $140_i$ to generate a set of scored archived image frames. The score assigned to an image frame may be on any suitable scale (e.g., 0 to 100, 0 to 1, etc.). The score may indicate the likelihood that an image frame is without identifiable information. The score assigned at step 442 may be performed by the regressor of the computing system 105, as described elsewhere in this document. The set of image frames to be scored may be selected from the archived video stream $140_i$ in any suitable manner (e.g., image frames spaced apart in time in the archived video stream $140_i$ at a fixed interval or non-fixed interval, consecutive image frames in the archived video stream $140_i$ that occur immediately prior to the request or at a defined offset from the time of the request, etc.). At step 434, the plurality of archived image frames 240 are selected from the set of scored archived image frames based on the score assigned to each image frame of the set of scored archived image frames. The image frames in the set of scored archived image frames may be ranked, and a threshold number of highest ranking image frames may be selected as the plurality of archived image frames 240 for the producing of the background model therefrom. As the plurality of archived image frames 240, used to generate the background model $220_i$, is selected from the set of scored archived image frames, the set of scored archived image frames (and the set of image frames pre-scoring) includes at least the plurality of archived image frames 240. At step 462, the plurality of archived image frames 240 of the archived video stream $140_i$ is processed to generate the background model $220_i$. Step 462 may be performed as described elsewhere in this document, such as described at step 406 of FIG. 4.

Figure 9:
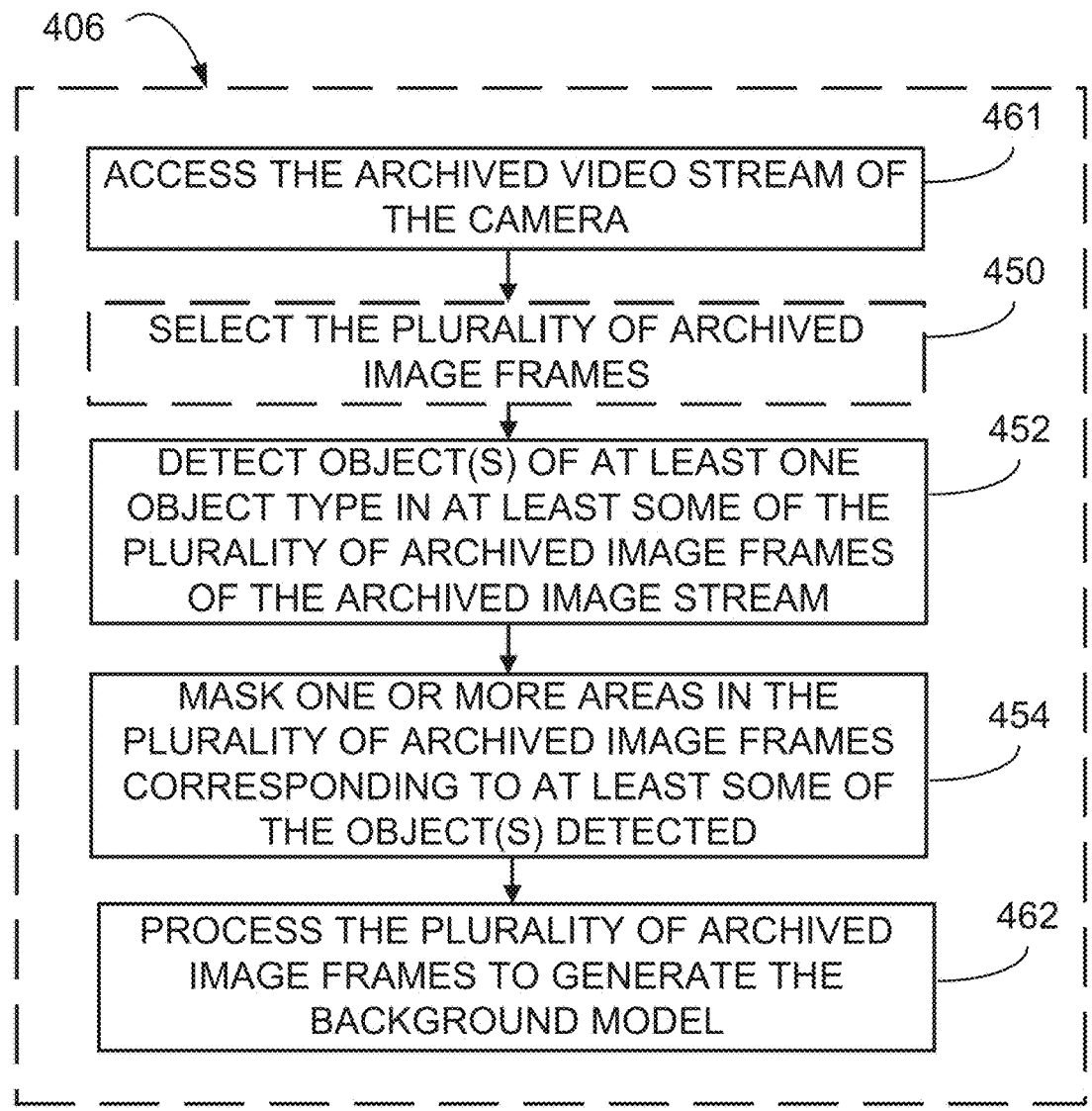
FIG. 9 is a flowchart illustrating an example of the step generating the background model of the method of FIG. 4 by use of detecting and masking one or more objects in image frames, in accordance with one or more embodiments.
Figure 10:
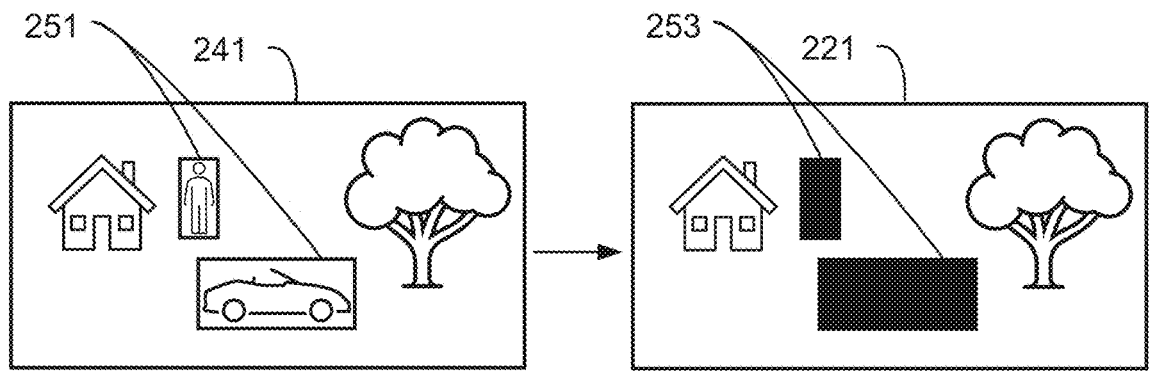
FIG. 10 is a diagram illustrating an example of an archive image frame with objects detected therein and an example of a corresponding background model, in accordance with one or more embodiments.

With reference to FIG. 9, there is shown a flowchart illustrating an example of step 406 of the method 400 for accessing the archived video stream $140_i$ of the camera $110_i$ in the data repository 150 and processing the plurality of archived image frames 240 of the archived video stream $140_i$ to generate a background model $220_i$. At step 461, the archived video stream $140_i$ of the camera $110_i$ in the data repository 150 is accessed. Step 461 may be performed as described elsewhere in this document, such as described at step 406 of FIG. 4. In some embodiments, at step 450, the plurality of image frames 240 of the archived video stream $140_i$ can be selected, for example, such as at step 434 of FIG. 7 and/or step 444 of FIG. 8. At step 452, the archived video stream $140_i$ is processed to detect one or more objects of at least one object type in at least some image frames of the plurality of archived image frames 240 of the archived video stream $140_i$. The plurality of image frames 240 may be image frames spaced apart in time in the archived video stream $140_i$ at a fixed interval or non-fixed interval. The plurality of image frames 240 may be consecutive image frames in the archived video stream $140_i$ that occur immediately prior to the request or at a defined offset from the time of the request. The plurality of image frames 240 may be as selected at step 450. At step 454, one or more areas in the plurality of archived image frames are masked. Masking may include colorizing (i.e., assigning a defined color to the one or more areas), blurring, inverting (i.e., inverting color values to the one or more areas), or pixelizing. The one or more areas that are masked correspond to at least some of the one or more objects detected in the at least some image frames of the plurality of archived image frames 240 of the archived video stream $140_i$. The one or more areas correspond to at least some of the one or more objects in the sense that the objects may be at least in part masked (i.e., partially or fully masked). The at least one object type may comprise a person. The at least one object type may comprise a vehicle. The at least one object type may comprise a license plate or other vehicle identifier. The at least one object type may comprise a face. Various other object types may be set by the user for detection. At step 462, the plurality of archived image frames 240 of the archived video stream $140_i$ is processed to generate the background model $220_i$. At step 462, the background model $220_i$ is generated with the plurality of archived image frames 240 having at least some of the one or more areas masked. Step 462 may be performed as described elsewhere in this document, such as described at step 406 of FIG. 4. With additional reference to FIG. 10, there is shown an example of objects 251 being detected in an archived image frame 241, and the corresponding areas 253 of the objects 251 are masked prior to being processed to generate the background model 221. In particular, in the example of FIG. 10, a person and a vehicle is detected in the archived image frame 241 and the background model 221 has the masked out portions therein.

Figure 11:
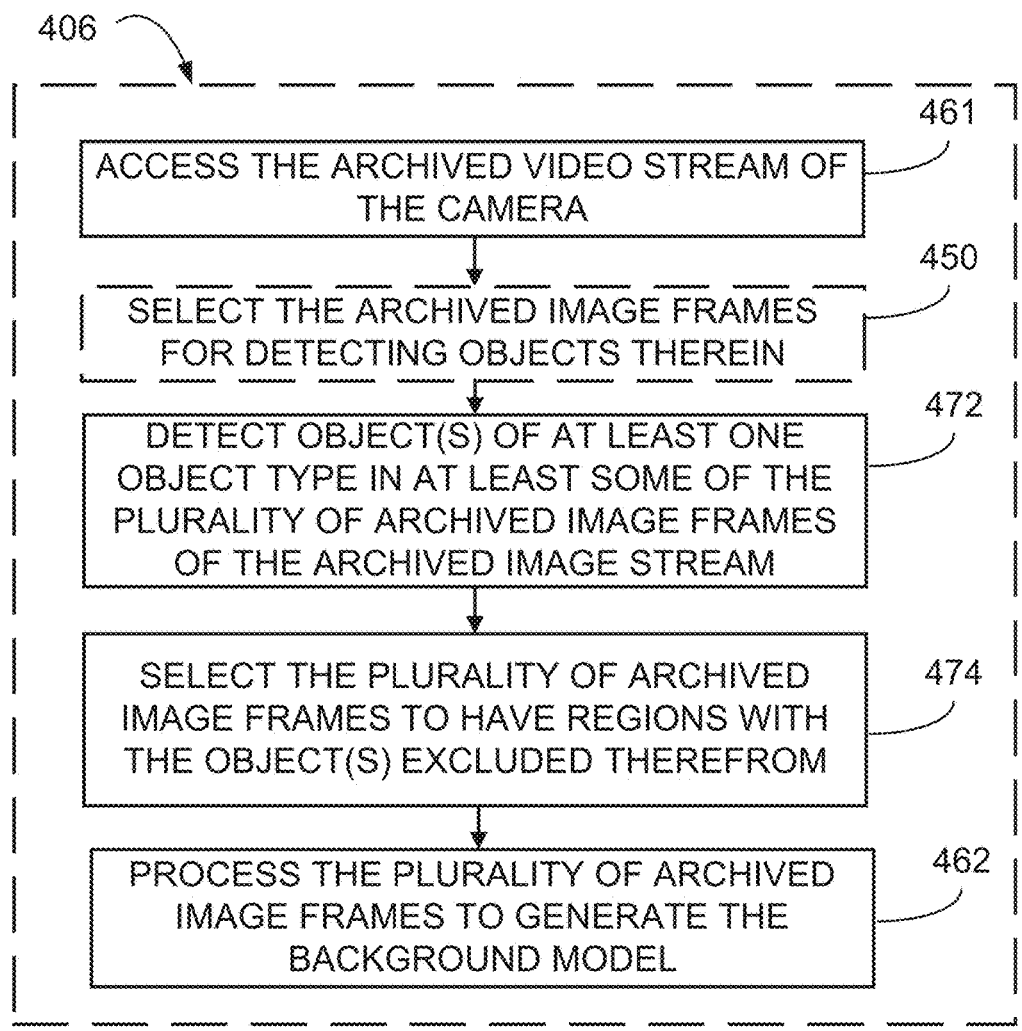
FIG. 11 is a flowchart illustrating an example of the step of generating the background model of the method of FIG. 4 by use of detecting and excluding one or more objects, in accordance with one or more embodiments.
Figure 12:
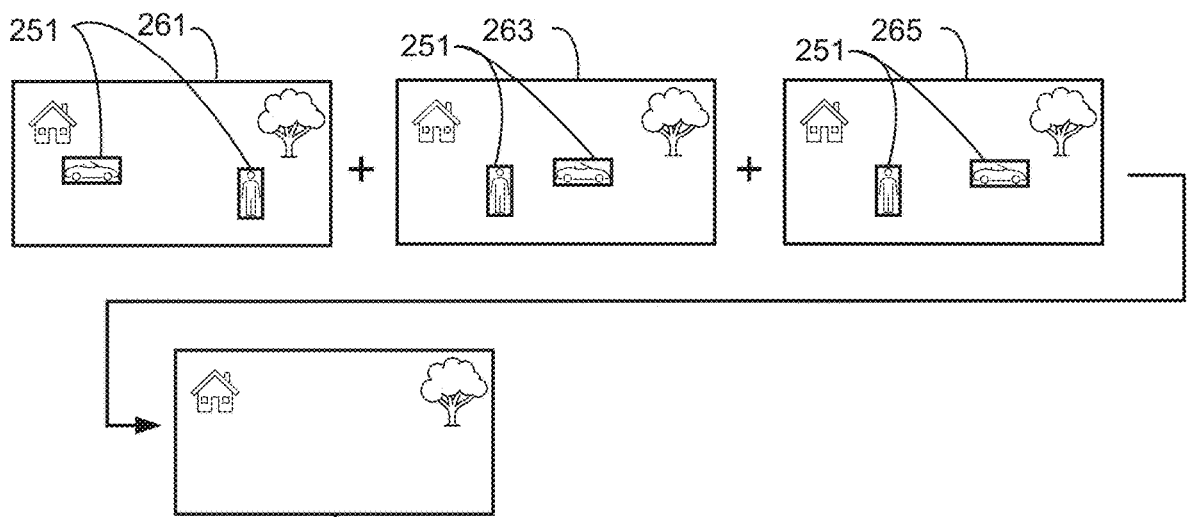
FIG. 12 is a diagram illustrating an example of archive image frames with objects detected therein and an example of a corresponding background model, in accordance with one or more embodiments.

With reference to FIG. 11, there is shown a flowchart illustrating an example of step 406 of the method 400 for accessing the archived video stream $140_i$ of the camera $110_i$ in the data repository 150 and processing the plurality of archived image frames 240 of the archived video stream $140_i$ to generate a background model $220_i$. At step 461, the archived video stream $140_i$ of the camera $110_i$ in the data repository 150 is accessed. Step 461 may be performed as described elsewhere in this document, such as described at step 406 of FIG. 4. In some embodiments, at step 450, the archived image frames of the archived video stream $140_i$ for detecting objects therein can be selected, for example, such as at step 434 of FIG. 7 and/or step 444 of FIG. 8. At step 472, the archived video stream $140_i$ is processed to detect one or more objects of at least one object type in at least some image frames of the plurality of archived image frames 240 of the archived video stream $140_i$. Step 472 may be implemented as described at step 452 of FIG. 10. At step 474, the plurality of archived image frames 240 are selected to have regions in the plurality of archived image frames 240 with the one or more objects excluded therefrom. The selection at step 474 may be a selection of a subset of a set of image frames, as in some embodiments at step 450 a set of image frames is selected and then a subset of the set of image frames is selected at step 474, which results in the plurality of archived image frames 240 for processing at step 462. At step 462, the plurality of archived image frames 240 of the archived video stream $140_i$ is processed to generate the background model $220_i$. At step 462, the background model $220_i$ is generated based on combing the regions of the plurality of archived image frames 240 to have the one or more objects excluded therefrom. Step 462 may be performed as described elsewhere in this document, such as described at step 406 of FIG. 4. With additional reference to FIG. 12, there is shown an example of object areas 251 corresponding to objects detected in multiple archived image frames 261, 263, 265, which are then excluded from the generation of the background model 223. The object areas 251 may be excluded from the archived image frames 261, 263, 265 and then combined to form the background model 223.

Figure 13:
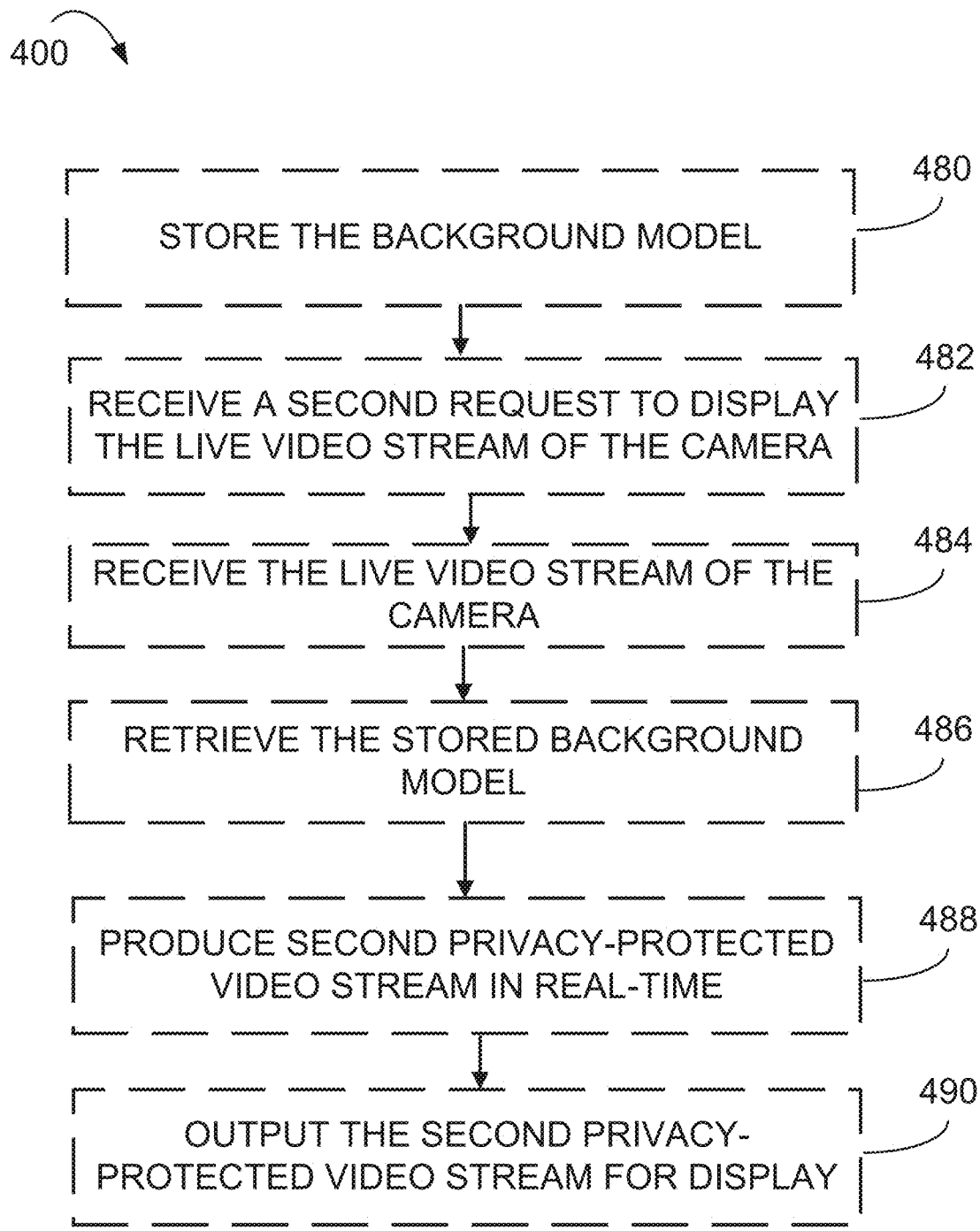
FIG. 13 is a flowchart illustrating examples of optional steps of the method of FIG. 4 to produce a second privacy-protected video stream, in accordance with one or more embodiments.

With reference to FIG. 13, there is shown a flowchart illustrating examples of optional steps of the method 400 of FIG. 4. In some embodiments, the request of step 402 of the method 400 is a first request and the privacy-protected video stream $160_i$ output at step 410 is a first privacy-protected video stream $160_i$. In some embodiments, at step 480, the method 400 further comprises storing the background model $220_i$ in computer-readable memory for retrieval when the first privacy-protected video stream $160_i$ is no longer being displayed. The background model $220_i$ may be stored in the memory of the computing system 105. The background model $220_i$ may be stored in the memory of the data repository 150. The background model $220_i$ may be stored in association with the identifier indicative of the camera $110_i$ that the background model $220_i$ corresponds thereto. In some embodiments, at step 482, the method 400 further comprises receiving a second request to display the live video stream $120_i$ of the camera $110_i$. In some embodiments, at step 482, the method 400 further comprises retrieve the live video stream $120_i$ of the camera $110_i$. The second request occurs after the first request. In some embodiments, at step 486, the method 400 further comprises retrieving from the computer-readable memory the background model $220_i$ for the camera $110_i$ that was generated when the first privacy-protected video stream $160_i$ was displayed. The identifier indicative of the camera $110_i$ that the background model $220_i$ corresponds thereto can be used to retrieve the background model $220_i$, as the identifier may be included in the second request at step 482. In some embodiments, at step 488, the method 400 further comprises producing a second privacy-protected video stream $160_i'$ by processing the live video stream with the background model $220_i$ that was generated when the first privacy-protected video stream $160_i$ was displayed. Step 488 may be implemented in a same or similar manner to step 408. In some embodiments, at step 490, the method 400 further comprises outputting the second privacy-protected video stream $160_i'$ for display. Step 490 may be implemented in a same or similar manner to step 410.

Figure 14:
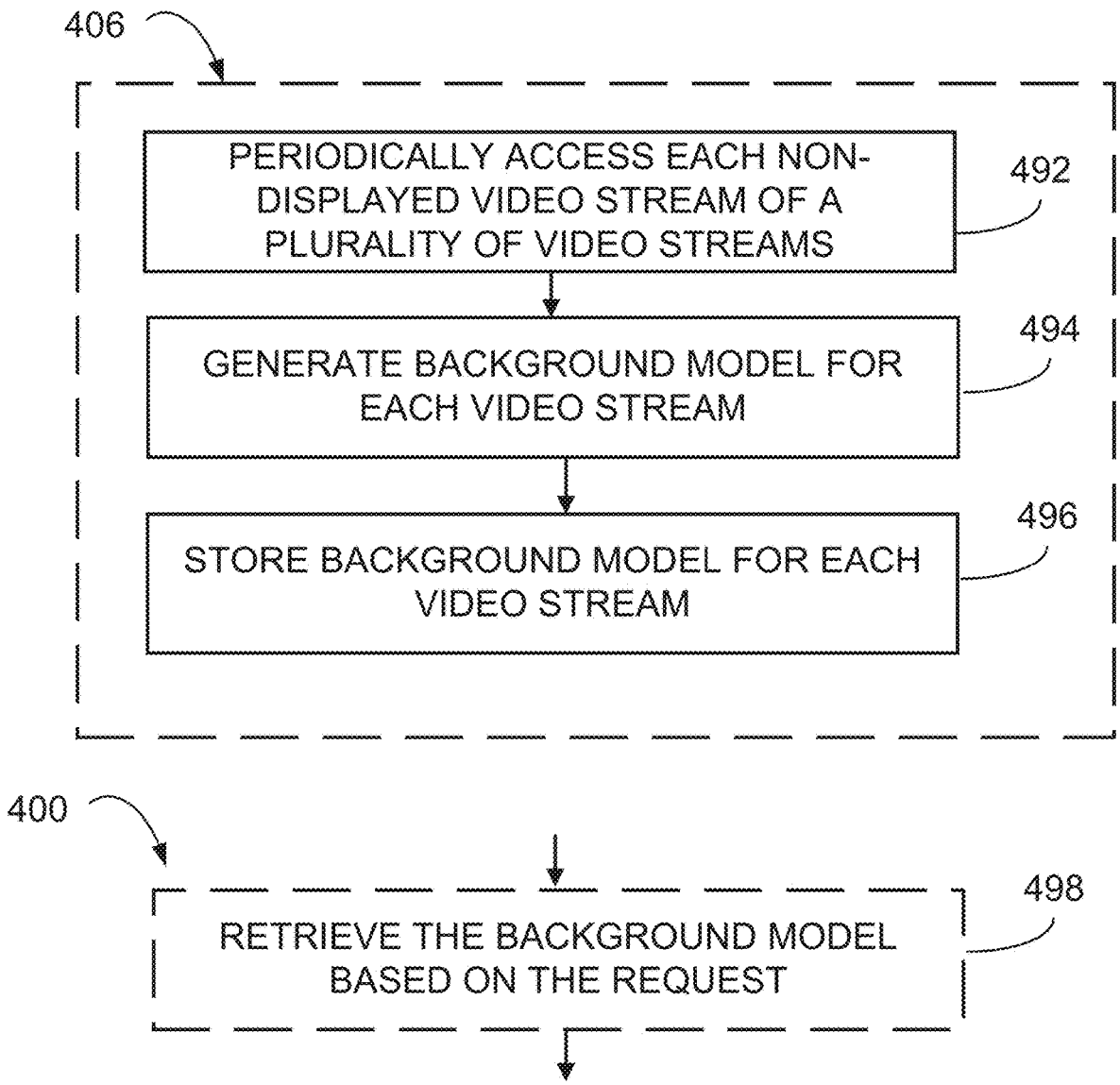
FIG. 14 is a flowchart illustrating an example of the step of generating the background model of the method of FIG. 4 and another flowchart illustrating an optional step of the method of FIG. 4.

With reference to FIG. 14, there is shown a flowchart illustrating an example of step 406 of the method 400 and another flowchart illustrating an optional step of the method 400. In some embodiments, step 406 comprises, at step 492, periodically accessing each non-displayed video stream of a plurality of video streams $140_{1, 2 \ldots N}$ of a plurality of cameras $110_1$. The plurality of video streams $140_{1, 2 \ldots N}$ including the archived video stream $140_1$ of the camera $110_i$. In some embodiments, step 406 comprises, at step 494, processing each one of the plurality of video streams $140_{1, 2 \ldots N}$ to generate a respective background model $220_1$ for each of the plurality of cameras $110_{1, 2 \ldots N}$. In some embodiments, step 406 comprises, at step 496, storing each respective background model $220_i$ in computer-readable memory such that the computer-readable memory has stored therein a plurality of background models $200_{1, 2 \ldots N}$ for each of the plurality of cameras $110_{1, 2 \ldots N}$. In some embodiments, at step 496, the method 400 further comprises retrieving the background model $220_i$ for the camera $110_i$ from the computer-readable memory based on the request to display the live video stream $120_i$ of the camera $110_i$.

Figure 15:
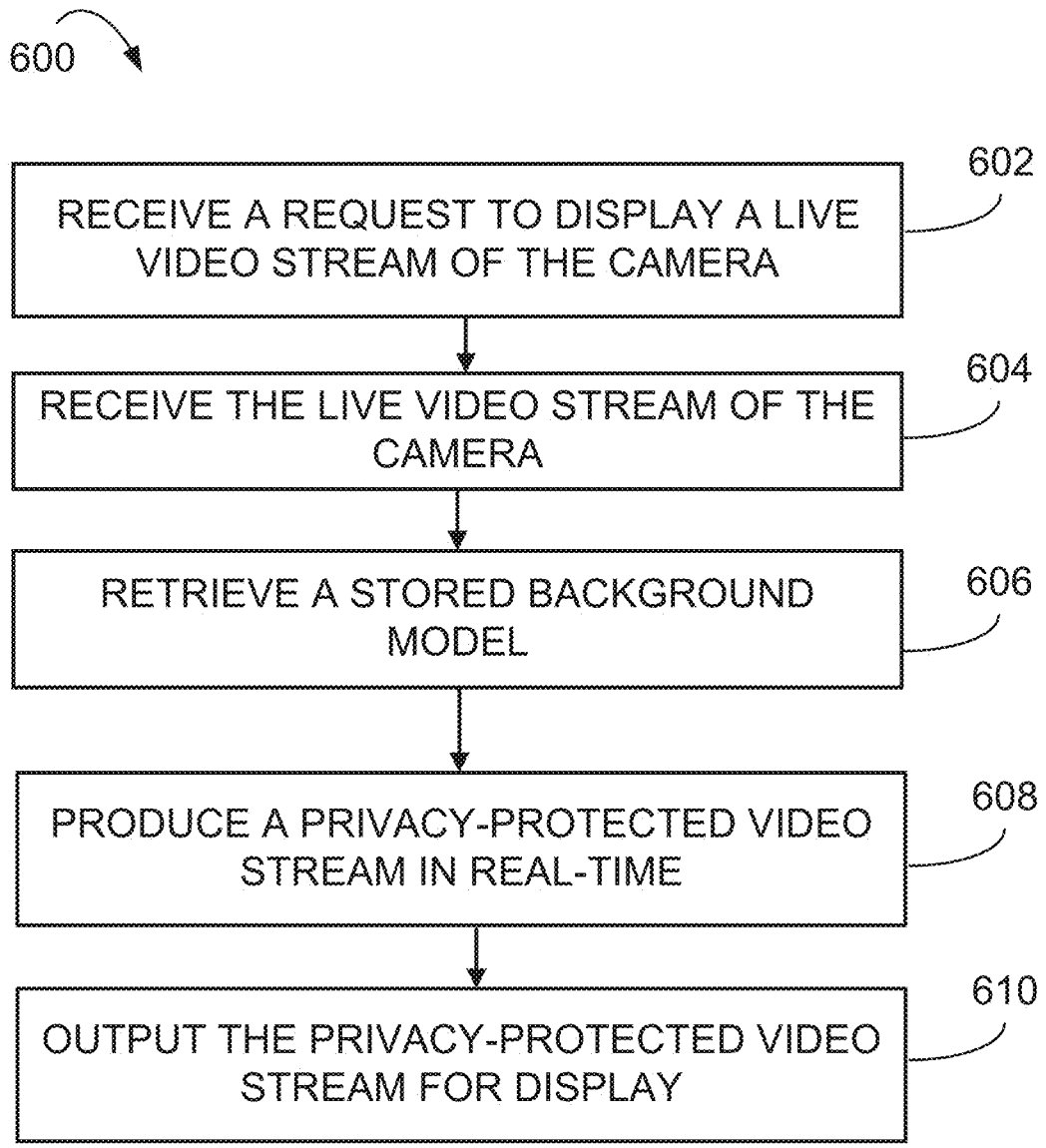
FIG. 15 is a flowchart illustrating an example method for producing a privacy-protected video stream based on retrieving a stored background model, in accordance with one or more embodiments.

With reference to FIG. 15, there is illustrated a flowchart for producing a privacy-protected video stream $160_i$. Step 602 comprises receiving a request to display a live video stream $120_i$ of a camera $110_i$. Step 602 may be implemented as described elsewhere in this document, for example, as in relation to step 402 of the method 400 of FIG. 4. Step 604 comprises receiving the live video stream $120_i$ of the camera $110_i$. Step 604 may be implemented as described elsewhere in this document, for example, as in relation to step 404 of the method 400 of FIG. 4. Step 606 comprises retrieving a stored background model $220_i$ for that the camera $110_i$ and/or live video stream $120_i$ based on the request. The background model $220_i$ may have been generated based on when the live video stream $120_i$ was previously displayed with privacy protection and stored to memory. Step 606 may be implemented as described elsewhere in this document, for example, as in relation to step 486 of the method 400 of FIG. 13. Step 608 comprises producing the privacy-protected video stream $160_i$ in real-time using the background model $220_i$ retrieved at step 606. Step 608 may be implemented as described elsewhere in this document, for example, as in relation to step 408 of the method 400 of FIG. 4. Step 610 comprises outputting the privacy-protected video stream $160_i$ for display. Step 610 may be implemented as described elsewhere in this document, for example, as in relation to step 410 of the method 400 of FIG. 4.

Figure 16:
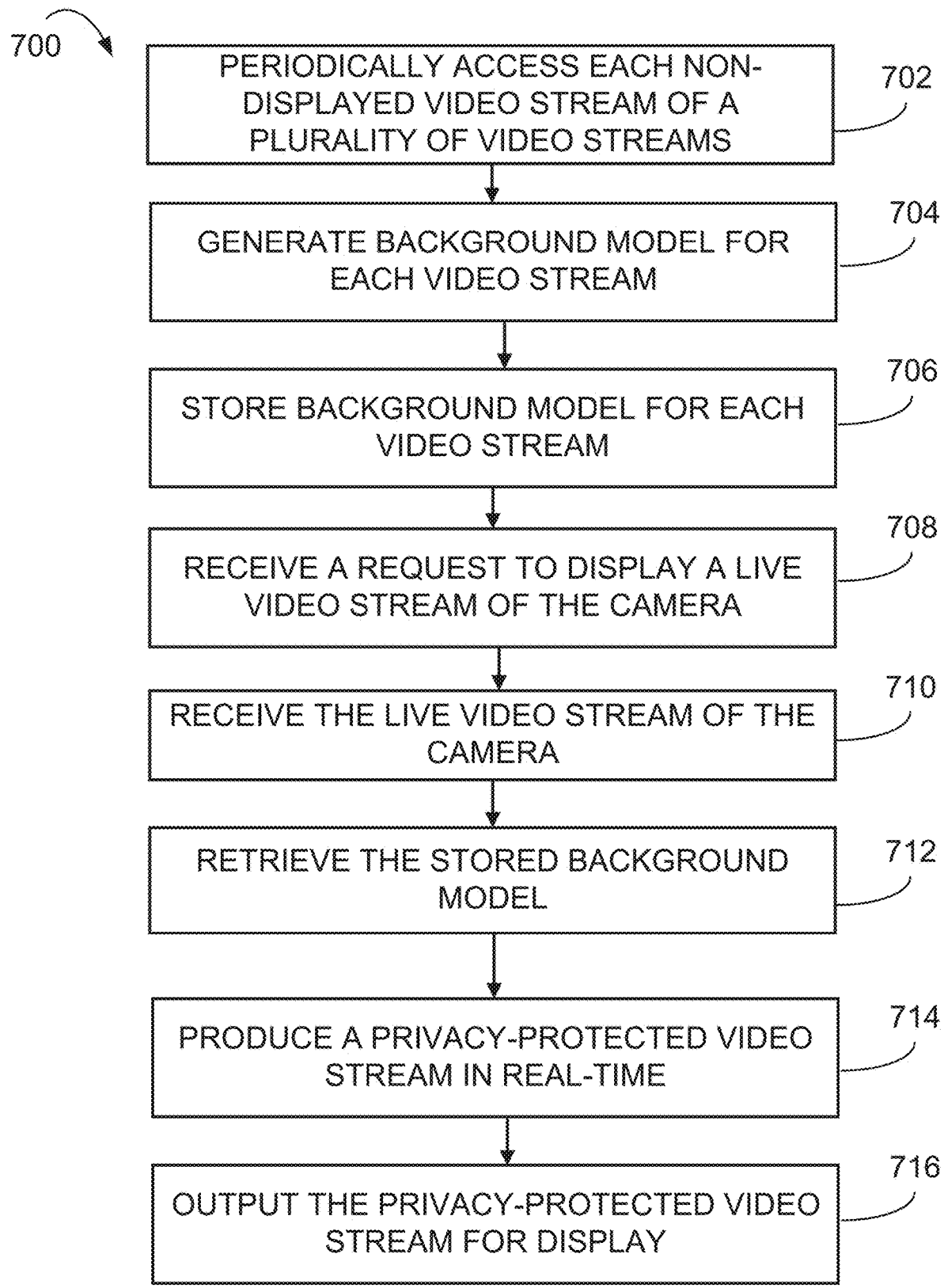
FIG. 16 is a flowchart illustrating an example method for producing a privacy-protected video stream based on periodically updating a background model, in accordance with one or more embodiments.

With reference to FIG. 16, there is illustrated a flowchart for producing a privacy-protected video stream $160_i$. Step 702 comprises periodically accessing each non-displayed video stream of a plurality of live video streams $120_{1, 2 \ldots N}$ of a plurality of cameras $110_{1, 2 \ldots N}$. Step 702 may be implemented as described elsewhere in this document, for example, as in relation to step 492 of the method 400 of FIG. 14. Step 704 comprises processing each non-displayed video stream of the plurality of live video streams $120_{1, 2 \ldots N}$ to generate a background model $220_i$ for each of the plurality of cameras $110_{1, 2 \ldots N}$. Step 704 may be implemented as described elsewhere in this document, for example, as in relation to step 494 of the method 400 of FIG. 14. Step 706 comprises storing the background model $220_i$ for each of the plurality of cameras $110_{1, 2 \ldots N}$ in memory. Step 706 may be implemented as described elsewhere in this document, for example, as in relation to step 496 of the method 400 of FIG. 14. Step 708 comprises receiving a request to display a live video stream $120_i$ of a camera $110_i$. Step 708 may be implemented as described elsewhere in this document, for example, as in relation to step 402 of the method 400 of FIG. 4. Step 710 comprises receiving the live video stream $120_i$ of the camera $110_i$. Step 710 may be implemented as described elsewhere in this document, for example, as in relation to step 404 of the method 400 of FIG. 4. Step 712 comprises retrieving a stored background model $220_i$ for that the camera $110_i$ and/or live video stream $120_i$ based on the request. The background model $220_i$ may have been generated based on when the live video stream $120_i$ was previously displayed with privacy protection. Step 712 may be implemented as described elsewhere in this document, for example, as in relation to step 498 of the method 400 of FIG. 14. Step 714 comprises producing the privacy-protected video stream $160_i$ in real-time using the background model $220_i$ retrieved at step 712. Step 714 may be implemented as described elsewhere in this document, for example, as in relation to step 408 of the method 400 of FIG. 4. Step 716 comprises outputting the privacy-protected video stream $160_i$ for display. Step 716 may be implemented as described elsewhere in this document, for example, as in relation to step 410 of the method 400 of FIG. 4.

The order of the steps of the method(s) 400, 600, and/or 700 may vary depending on practical implementations and when suitable to change the order. Similarly, when suitable, the various steps of the method(s) 400, 600 and/or 700 described herein may be combined, uncombined, and/or omitted. For example, step 404 may occur before step 402.

In some embodiments, the background model $220_i$ generated at step 406 is an initial background model $220_i$. The method 400 may further comprise continuously or periodically processing the live video stream $120_i$ to update the background model $220_i$. In other words, once the initial background model $220_i$, which is generated from an archived video stream $140_i$, is produced, it can then be revised upon based on processing the live video stream $120_i$ in accordance with any of the techniques described herein.

While multiple cameras $110_{1, 2 \ldots N}$ and multiple archived video streams $140_{1, 2 \ldots N}$ are shown in FIG. 1, in some embodiments, the methods and systems described herein may be implemented in an environment with a single camera 110 and a single corresponding archived video stream 140 to produce a privacy protected video stream 160.

Figure 17:
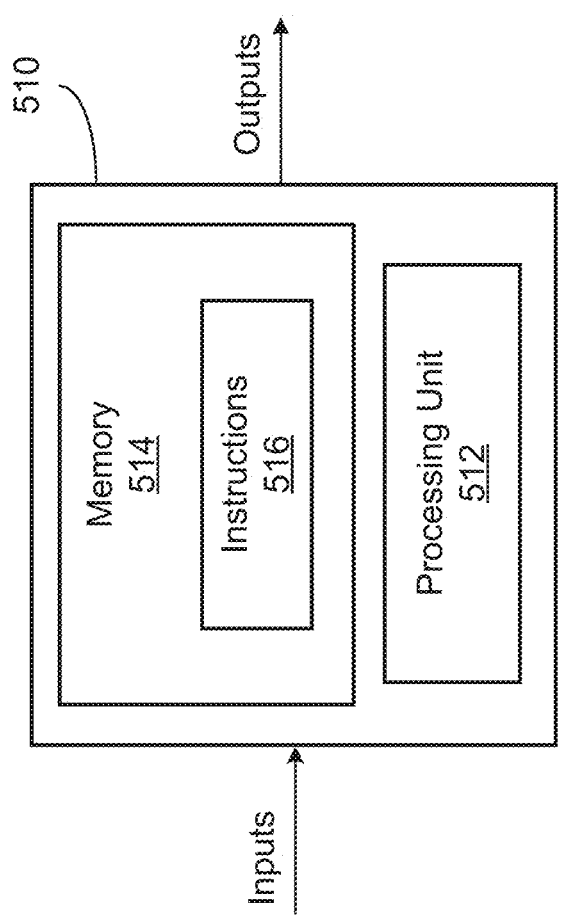
FIG. 17 is a schematic diagram of an example computing device, in accordance with one or more embodiments.

With reference to FIG. 17, the method 400, 600 and/or 700 may be implemented by one or more computing devices, such as a computing device 510 comprising a processing unit 512 and a memory 514 which has stored therein computer-executable instructions 416. Each of the computing system 105 and the computer 170 may each be implemented by and/or comprise at least one computing device, such as the computing device 510.

The processing unit 512 may comprise any suitable devices configured to implement the method 400 such that instructions 516, when executed by the computing device 510 or other programmable apparatus, may cause the functions/acts/steps performed as part of the method 400 as described herein to be executed. The processing unit 512 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 412 may be referred to as a "processor".

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512. The memory of the data repository 150 may be implemented according to the memory 514, and may comprise any suitable known or other machine-readable storage medium.

The methods and systems described herein may be implemented in a high level procedural or object oriented programming or scripting language, or a combination thereof, to communicate with or assist in the operation of a computer system, for example the computing device 510. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 512 of the computing device 510, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A computer-implemented method for producing a privacy-protected video stream, the method comprising:
   receiving a request to display a live video stream of a camera;
   receiving the live video stream in real-time comprising a plurality of live image frames from the camera;
   accessing an archived video stream of the camera in a data repository and processing a plurality of archived image frames of the archived video stream to generate a background model comprising imagery common to multiple ones of the plurality of archived image frames, the plurality of archived image frames occurring in time prior to the request to display the live video stream;
   producing the privacy-protected video stream in real-time by:
      performing a comparison between the background model and each live image frame of the plurality of live image frames of the live video stream to identify one or more privacy protection candidate zones in each live image frame of the plurality of live image frames; and
      obscuring at least one of the one or more privacy protection candidate zones in each live image frame of the plurality of image frames to produce the privacy-protected video stream; and
   outputting the privacy-protected video stream for display.

2. The method of claim 1, wherein the plurality of archived image frames corresponds to a plurality of consecutive image frames in the archived video stream for a defined time period.

3. The method of claim 1, wherein the plurality of archived image frames corresponds to a plurality of sets of one or more image frames spaced apart in time in the archived video stream at a fixed interval.

4. The method of claim 1, wherein the plurality of archived image frames occurs at a defined offset in time from the request to display the live video.

5. The method of claim 1, further comprising processing the archived video stream to identify the plurality of archived image frames as corresponding to image frames meeting a selection criteria.

6. The method of claim 5, wherein the selection criteria is at least one of:
   a number of detected people in the plurality of archived image frames is below a threshold number of people;
   a number of detected vehicles in the plurality of archived image frames is below a threshold number of vehicles; and
   each timestamp of the plurality of archived image frames occurs during a predefined range of time.

7. The method of claim 1, further comprising:
   processing the archived video stream to assign a classification to each image frame of a set of image frames of the archived video stream, the set of image frames including the plurality of archived image frames; and selecting the plurality of archived image frames from the set of image frames based on the classification assigned to each image frame of the set of image frames.

8. The method of claim 1, further comprising:
processing the archived video stream to assign a score to each image frame of a set of image frames of the archived video stream, the set of image frames including the plurality of archived image frames; and
selecting the plurality of archived image frames from the set of image frames based on the score assigned to each image frame of the set of image frames.

9. The method of claim 1, further comprising:
processing the plurality of archived image frames to detect one or more objects of at least one object type in at least some image frames of the plurality of archived image frames; and
masking one or more areas in the plurality of archived image frames corresponding to at least some of the one or more objects detected in the at least some image frames of the plurality of archived image frames; and
wherein the background model is generated with the plurality of archived image frames having at least some of the one or more areas masked.

10. The method of claim 9, wherein the at least one object type is at least one of people and vehicles.

11. The method of claim 1, further comprising:
processing the archived video stream to detect one or more objects of at least one object type in the archived video stream; and
selecting the plurality of archived image frames to have regions in the plurality of archived image frames with the one or more objects excluded therefrom;
wherein the background model is generated based on combing the regions of the plurality of archived image frames to have the one or more objects excluded therefrom.

12. The method of claim 11, wherein the at least one object type is at least one of people and vehicles.

13. The method of claim 1, wherein the request is a first request and the privacy-protected video stream is a first privacy-protected video stream, the method further comprising:
storing the background model in computer-readable memory for retrieval when the first privacy-protected video stream is no longer being displayed;
receiving a second request to display the live video stream of the camera, the second request occurring after the first request;
retrieving from the computer-readable memory the background model for the camera that was generated when the first privacy-protected video stream was displayed;
producing a second privacy-protected video stream by processing the live video stream with the background model that was generated when the first privacy-protected video stream was displayed; and
outputting the second privacy-protected video stream for display.

14. The method of claim 1, wherein accessing the archived video stream of the camera and processing the plurality of archived image frames to generate the background model comprises: periodically accessing each non-displayed video stream of a plurality of video streams of a plurality of cameras, the plurality of video streams including the archived video stream of the camera, and processing each one of the plurality of video streams to generate a respective background model for each of the plurality of cameras, and storing each respective background model in computer-readable memory; the method further comprising: retrieving the background model for the camera from the computer-readable memory based on the request to display the live video stream of the camera.

15. The method of claim 1, wherein accessing the archived video stream of the camera in the data repository comprises: identifying, based on the request to display the live video stream of the camera, a location for the archived video stream in the data repository that has stored therein archived video streams from multiple cameras.

16. The method of claim 1, wherein the plurality of archived image frames corresponds to a plurality of I-frames in the archived video stream that can be decoded without other image frames of the archived video stream and are periodically within the archived video stream for starting points of decoding the archived video stream.

17. The method of claim 1, wherein the background model is generated without decoding the plurality of archived image frames.

18. The method of claim 1, wherein the background model is generated without any information from the plurality of live image frames of the live video stream.

19. The method of claim 1, wherein the background model is generated in faster-than-real-time such that a processing time to generate the background model is less than a total length of playback time of the plurality of archived image frames used to generate the background model.

20. A computing system for producing a privacy-protected video stream, the computing system comprising:
at least one processor; and
at least one non-transitory computer-readable memory having stored thereon program instructions executable by the at least one processor for:
receiving a request to display a live video stream of a camera;
receiving the live video stream in real-time comprising a plurality of live image frames from the camera;
accessing an archived video stream of the camera in a data repository and processing a plurality of archived image frames of the archived video stream to generate a background model comprising imagery common to multiple ones of the plurality of archived image frames, the plurality of archived image frames occurring in time prior to the request to display the live video stream;
producing the privacy-protected video stream in real-time by:
performing a comparison between the background model and each live image frame of the plurality of live image frames of the live video stream to identify one or more privacy protection candidate zones in each live image frame of the plurality of live image frames; and
obscuring at least one of the one or more privacy protection candidate zones in each live image frame of the plurality of image frames to produce the privacy-protected video stream; and
outputting the privacy-protected video stream for display.

21. A non-transitory computer-readable storage medium having stored thereon program instruction which, when executed, cause at least one processor to:
receive a request to display a live video stream of a camera;
receive the live video stream in real-time comprising a plurality of live image frames from the camera;
access an archived video stream of the camera in a data repository and processing a plurality of archived image frames of the archived video stream to generate a background model comprising imagery common to multiple ones of the plurality of archived image frames, the plurality of archived image frames occurring in time prior to the request to display the live video stream;
produce the privacy-protected video stream in real-time by:
  performing a comparison between the background model and each live image frame of the plurality of live image frames of the live video stream to identify one or more privacy protection candidate zones in each live image frame of the plurality of live image frames; and
  obscuring at least one of the one or more privacy protection candidate zones in each live image frame of the plurality of image frames to produce the privacy-protected video stream; and
output the privacy-protected video stream for display.

* * * * *